US007536257B2

(12) United States Patent
Nishibori et al.

(10) Patent No.: US 7,536,257 B2
(45) Date of Patent: May 19, 2009

(54) PERFORMANCE APPARATUS AND PERFORMANCE APPARATUS CONTROL PROGRAM

(75) Inventors: Yu Nishibori, Hamamatsu (JP); Yasuhiko Asahi, Iwata (JP); Toshio Iwai, Mitaka (JP)

(73) Assignee: Yamaha Corporation (JP)

( * ) Notice: Subject to any disclaimer, the term of this patent is extended or adjusted under 35 U.S.C. 154(b) by 549 days.

(21) Appl. No.: 11/176,645

(22) Filed: Jul. 7, 2005

(65) Prior Publication Data

US 2006/0005693 A1 Jan. 12, 2006

(30) Foreign Application Priority Data

Jul. 7, 2004 (JP) ............................ 2004-200689
Jul. 7, 2004 (JP) ............................ 2004-200690

(51) Int. Cl.
*G01C 21/00* (2006.01)

(52) U.S. Cl. ....................................... 701/208; 701/200

(58) Field of Classification Search ......... 701/200–202, 701/208, 209, 211, 213–215; 340/988, 995.1, 340/995.17; 342/357.06, 357.12
See application file for complete search history.

(56) References Cited

U.S. PATENT DOCUMENTS 3,562,394 A 2/1971 Keipe
4,031,800 A 6/1977 Thompson
4,089,246 A 5/1978 Kooker
4,123,960 A 11/1978 Franzmann
4,384,503 A 5/1983 Gunn
4,422,365 A 12/1983 Iwaki
5,027,689 A 7/1991 Fujimori
5,088,378 A 2/1992 DeLaTorre
5,247,864 A 9/1993 Konishi
5,530,898 A 6/1996 Miyake
5,665,927 A 9/1997 Taki et al.

(Continued)

FOREIGN PATENT DOCUMENTS

DE 100 42 300 A1 3/2002

(Continued)

OTHER PUBLICATIONS

Specification and drawings of unpublished related co-pending U.S. Appl. No. 11/681,899, filed Mar. 5, 2007; Performance Apparatus and Tone Generation Method; Yu Nishibori et al.; pp. 1-60.

(Continued)

*Primary Examiner*—Yonel Beaulieu
(74) *Attorney, Agent, or Firm*—Rossi, Kimms & McDowell LLP

(57) ABSTRACT

A performance apparatus which can realize interesting performance with game elements. Coordinates are designated in a matrix display input section, and sounding data corresponding to the designated coordinates are generated. Sounding of musical tones based on the generated sounding data is instructed. Based on the designation of coordinates, a moving route is set, and a moving ball indicating corresponding present position coordinates on the set moving route among coordinates in the matrix display input section is generated. At least when the moving ball has reached predetermined coordinates on the moving route, sounding data corresponding to the predetermined coordinates is generated, and sounding of a musical tone based on the sounding data generated in association with the predetermined coordinates is instructed.

15 Claims, 20 Drawing Sheets

U.S. PATENT DOCUMENTS

| | | | | |
|---|---|---|---|---|
| 5,684,259 | A | 11/1997 | Horii | |
| 5,741,990 | A | 4/1998 | Davies | |
| 5,831,195 | A | 11/1998 | Nakata | |
| 5,908,997 | A | 6/1999 | Arnold et al. | |
| 5,936,180 | A | 8/1999 | Ando | |
| 6,160,213 | A | 12/2000 | Arnold et al. | |
| 6,179,432 | B1 | 1/2001 | Zhang et al. | |
| 6,347,998 | B1 | 2/2002 | Yoshitomi et al. | |
| 6,401,028 | B1 * | 6/2002 | Kamiya et al. | 701/200 |
| 6,516,269 | B2 * | 2/2003 | Takeuchi | 701/211 |
| 6,670,535 | B2 | 12/2003 | Anderson et al. | |
| 2002/0105359 | A1 | 8/2002 | Shimizu et al. | |
| 2002/0134223 | A1 | 9/2002 | Wesley | |
| 2003/0015087 | A1 | 1/2003 | Haken | |
| 2006/0005693 | A1 | 1/2006 | Nishibori et al. | |
| 2006/0236846 | A1 | 10/2006 | Nishibori | |
| 2007/0022865 | A1 | 2/2007 | Nishibori et al. | |
| 2007/0022868 | A1 | 2/2007 | Nishibori et al. | |

FOREIGN PATENT DOCUMENTS

| | | | |
|---|---|---|---|
| EP | 0632427 | A2 | 1/1995 |
| EP | 1748415 | A2 | 1/2000 |
| EP | 1710784 | A1 | 11/2006 |
| EP | 1748418 | A1 | 1/2007 |
| JP | 53-028414 | | 3/1978 |
| JP | 02-074997 | A | 3/1990 |
| JP | 03-182798 | A | 8/1991 |
| JP | 4-285765 | A | 10/1992 |
| JP | 7-325579 | A | 12/1995 |
| JP | 08-006549 | A | 1/1996 |
| JP | 8-110826 | A | 4/1996 |
| JP | 08-221074 | A | 8/1996 |
| JP | 09-068980 | A | 3/1997 |
| JP | 09-212157 | A | 8/1997 |
| JP | 09-319362 | A | 12/1997 |
| JP | 10-097251 | A | 4/1998 |
| JP | 2001-009152 | A | 1/2001 |
| JP | 2001-051681 | A | 2/2001 |
| JP | 2002-175080 | A | 6/2002 |
| JP | 2002-229567 | A | 8/2002 |
| JP | 2003-099039 | A | 4/2003 |
| JP | 2003-177754 | A | 6/2003 |
| JP | 2004-271783 | A | 9/2004 |
| JP | 2004-274570 | A | 9/2004 |
| JP | 2006-20785 | A | 1/2006 |

OTHER PUBLICATIONS

Office Action issued on Nov. 17, 2006 in Japanese Patent Application No. 2004-200689, from which the present application No. claims priority.

Office Action issued on Nov. 17, 2006 in Japanese Patent Application No. 2004-200690, from which the present application claims priority.

Hajime Tachibana Design and NTT Learning systems Corporation released i-Appli that changes cellular phone to music sequencer; disclosed in "Keitai News" on Jan. 16, 2002.

"Tenori-On" disclosed in "The World of Digital Stadium Curator", pp. 1-7, on the internet (www.nhk.or.jp/digista/lab/digista_ten/curator.html.), no date.

Japanese Office Action (Decision of Rejection) issued Jan. 30, 2007 in Japanese Patent Application No. 2004-200690 from which the present application claims priority.

European Search Report for European Patent Application No. EP 06015695 which corresponds to related co-pending U.S. Appl. No. 11/495,467; mailing date of Feb. 6, 2007; pp. 2-12.

Partial European Search Report of European Patent Application No. 06015695 which corresponds to related co-pending U.S. Appl. No. 11/495,467; mailing date of Oct. 26, 2006.

"Yamaha's Tenori-On LED-panel instrument", retrieved from http://www.engadget.com. Weblogs, Inc, 2003-2007.

"Keitai News", retrieved from http://k-tai.ascii24.com/k-tai/new/2002/01/16/632762-000.html, on Jan. 16, 2002, Japan (with English Translation).

Toshio Iwai, "World of Digista Curator", [online], Digital Stadium, Japan (with English Translation)., no date.

"Tenori-On", retrieved fro http://www.global.yahama.com/design, no date.

Office Action issued in European application No. EP 07103475.5, mailed on Jul. 13, 2007, which corresponds to related co-pending U.S. Appl. No. 11/681,899.

Notice of Grounds for Rejection issued in Japanese Patent Appl. No. 2005-293369 which corresponds to related co-pending U.S. Appl. No. 11/493,739. Mailing date: Jun. 19, 2007.

Korg Kaoss Pad KP2 Owner's Manual. 2002.

Korg Kaoss Pad KP2 Website; Accessed May 23, 2007. <http://www.korg.com/gear/info.asp?a_prod_no=KP2>.

Propellerhead Reason Operation Manual. Ludvig Carlson, Anders Nodrmark and Roger Wiklander. 2000.

Extended European Search Report of European Patent Application No. 06015696.5-2218, dated Nov. 20, 2006 which corresponds to related co-pending U.S. Appl. No. 11/493,739.

Office Action issued on Nov. 17, 2006 in Japanese Patent Application No. 2004-200689, from which this US Application claims priority.

Office Action issued on Nov. 17, 2006 in Japanese Patent Application No. 2004-200690, from which this US Application claims priority.

Japanese Office Action (Decision of Rejection) issued Jan. 30, 2007 in corresponding Japanese Patent Application No. 2004-200690.

"Hajime Tachibana Design and NTT Learning Systems Corporation released i-Appli that changes cellular phone to music sequencer" disclosed in "Keitai News" on Jan. 16, 2002.

"Tenori-On" disclosed in "The World of Digital Stadium Curator," p. 2, on the internet (www.nhk.or.jp/digista/lab/digista_ten/curator.html.).

"Tenori-On" disclosed in "The World of Digital Stadium Curator", pp. 1-7, on the internet (www.nhk.or.jp/digista/lab/digista_ten/curator.html.).

Toshio Iwai, "World of Digista Curator", [online], Digital Stadium, Japan (with English Translation).

"Tenori-On", retrieved fro http://www.global.yahama.com/design.

Notice of Grounds for Rejection issued in Japanese Patent Application No. 2005-293369, from which related co-pending U.S. Appl. No. 11/493,739 claims priority. Mailing date of Feb. 27, 2007.

Notice of Grounds for Rejection, issued in Japanese Patent Application No. 2005-109598, from which related co-pending U.S. Appl. No. 11/398,979 claims priority. Mailing date of Feb. 27, 2007.

Notice of Preliminary Rejection issued for Korean Patent Application No. 10-2006-0031407 dated Jan. 24, 2007, which corresponds to related co-pending U.S. Appl. No. 11/398,979.

Extended European Search Report issued for corresponding European Patent Application No. 06007180.0-218, dated Jul. 27, 2006, corresponding to related co-pending U.S. Appl. No. 11/398,979.

Extended European search report issued Nov. 13, 2007 in corresponding European patent application EP07103475.5; pp. 1-14. This European application corresponds to related co-pending U.S. Appl. No. 11/681,899.

Office Action (Notice of Grounds for Rejection) mailed Sep. 16, 2008, in Japanese Patent Application No. 2006-059957, corresponding to related co-pending U.S. Appl. No. 11/681,899.

* cited by examiner

PERFORMANCE APPARATUS AND PERFORMANCE APPARATUS CONTROL PROGRAM

BACKGROUND OF THE INVENTION

1. Field of the Invention

The present invention relates to a performance apparatus with game elements, and a performance apparatus control program.

2. Description of the Related Art

Conventionally, an application program referred to as TENORI-ON (registered trademark) has been known as mentioned in "Keitai News" ([online], Jan. 16, 2002, ASCII, <URL: http://k-tai.ascii24.com/k-tai/news/2002/01/16/632762-000.html?geta>) and "The World of Digista Curators" (Digital Stadium, Toshio Iwai, submitted work=TENORI-ON, <URL: http://www.nhk.or.jp/digista/lab/digista ten/curator.html>). In performance apparatuses such as cellular phones and game machines on which this application program operates, designated point inputs are accepted on a 16×16 grid configured in a matrix where the abscissa indicates timing and the ordinate indicates pitch, and in accordance with timing, LEDs at the designated points emit light and tones are sounded at pitches corresponding to the designated points in order from the left column. Therefore, even beginners can enjoy composing and playing music with ease.

However, in the performance apparatuses to which the application program indicated in the "Keitai News" and "The World of Digista Curators" is applied, the way of playing is limited. Thus, there is room for improvement in realizing more interesting games with performance elements.

SUMMARY OF THE INVENTION

It is a first object of the present invention to provide a performance apparatus and a performance apparatus control program which can realize interesting performance with game elements.

It is a second object of the present invention to provide a performance apparatus and a performance apparatus control program which enable sounding in response to the movement of designated coordinates, to thereby realize interesting performance.

To attain the first object, in a first aspect of the present invention, there is provided a performance apparatus comprising a coordinate designating device capable of designating individual coordinates in a two-dimensional area, a sounding data generating device that generates sounding data corresponding to coordinates in the two-dimensional area, a musical tone generation instructing device that instructs sounding of musical tones based on the sounding data generated by the sounding data generating device, and a moving coordinate generating device that sets a moving route based on the designation of coordinates by the coordinate designating device, and generates moving coordinates indicating corresponding present position coordinates on the set moving route among coordinates in the two-dimensional area, wherein at least when the moving coordinates have reached predetermined coordinates on the moving route, the sounding data generating device generates sounding data corresponding to the predetermined coordinates, and the musical tone generation instructing device instructs sounding of a musical tone based on the sounding data generated in association with the predetermined coordinates.

Preferably, the moving route is set to pass through a plurality of coordinates designated by the coordinate designating device and to extend along a substantially straight line connecting between the designated plurality of coordinates.

Preferably, the coordinate designating device is capable of canceling designation of individual ones of the designated coordinates, and the performance apparatus further comprises a route correcting device that corrects the moving route when the coordinate designating device cancels designation of any of the designated coordinates on the moving route.

Alternatively, the performance apparatus comprises a route correcting device that is operable when the moving coordinates have reached an outer edge of the two-dimensional area, to correct the moving route so as to cause the moving coordinates to be reflected at coordinates of the outer edge.

Preferably, the performance apparatus comprises a shifting device that shifts a plurality of coordinates designated by the coordinate designating device while maintaining a relative positional relationship therebetween.

Preferably, the performance apparatus comprises a plurality of visible display sections arranged with respect to respective coordinates in the two-dimensional area, and a visible display section controller that controls the plurality of visible display sections, and wherein the visible display section controller provides control such that at least when the moving coordinates have reached the predetermined coordinates on the moving route, a visible display section corresponding to the predetermined coordinates is visibly displayed.

Preferably, the moving coordinate generating device sets the moving route according to a number of designated coordinates.

With the arrangement of the first aspect of the present invention, moving coordinates are generated to realize interesting performance with game elements.

To attain the first object, in a second aspect of the present invention, there is provided a performance apparatus control program for causing a computer to execute a performance apparatus control method comprising a coordinate designating step of designating individual coordinates in a two-dimensional area, a sounding data generating step of generating sounding data corresponding to coordinates in the two-dimensional area, a musical tone generation instructing step of instructing sounding of musical tones based on the sounding data generated in the sounding data generating step, and a moving coordinate generating step of setting a moving route based on the designation of coordinates in the coordinate designating step, and generating moving coordinates indicating corresponding present position coordinates on the set moving route among coordinates in the two-dimensional area, wherein at least when the moving coordinates have reached predetermined coordinates on the moving route, sounding data corresponding to the predetermined coordinates is generated in the musical tone data generating step, and sounding of a musical tone is instructed based on the sounding data generated in association with the predetermined coordinates in the musical tone generation instructing step.

To attain the second object, in a third aspect of the present invention, there is provided a performance apparatus comprising a coordinate designating device capable of designating two-dimensional coordinates, a coordinate moving device that moves coordinates designated by the coordinate designating device in a predetermined direction, and a musical tone generation instructing device that is operable when the designated coordinates moved by the coordinate moving device have reached predetermined coordinates, to instruct sounding of a musical tone corresponding to the predetermined coordinates.

Preferably, when the designated coordinates are more than one, the coordinate moving device moves the designated coordinates while maintaining relative positional relationship between the designated coordinates.

Preferably, the coordinate designating device is capable of designating the two-dimensional coordinates with respect to a designation enable area, and the performance apparatus comprises a two-dimensional display area in which a plurality of visible display sections are two-dimensionally arranged, a visible display section controller that controls the plurality of visible display sections in the two-dimensional display area, and an area moving device that moves the designation enable area on a plane relative to the two-dimensional display area, and wherein the visible display section controller provides control such that at least one of the visible display sections corresponding to the designated coordinates in an area of the designation enable area included in the two-dimensional display area is visibly displayed.

Preferably, the musical tone generating instructing device is operable when the designated coordinates moved by the coordinate moving device have reached an outer edge position of a predetermined area, to instruct sounding of a musical tone corresponding to the outer edge position.

Preferably, the coordinate moving device causes the designated coordinates being moved to disappear from a predetermined area after the designated coordinates have reached an outer edge position of the predetermined area.

Preferably, the coordinate moving device carries out at least one of automatic movement and manual movement of the designated coordinates that have been designated.

Preferably, the coordinate moving device carries out at least one of automatic movement and manual movement of the designated coordinates that have been designated.

With the arrangement of the third aspect of the present invention, tones can be sounded in response to the movement of designated coordinates to realize interesting performance.

To attain the second object, in a fourth aspect of the present invention, there is provided a performance apparatus control program for causing a computer to execute a performance apparatus control method comprising a coordinate designating step of designating two-dimensional coordinates, a coordinate moving step of moving coordinates designated in the coordinate designating step in a predetermined direction, and a musical tone generation instructing step of instructing sounding of a musical tone corresponding to predetermined coordinates when the designated coordinates moved in the coordinate moving step have reached the predetermined coordinates.

The above and other objects, features, and advantages of the invention will become apparent from the following detailed description taken in conjunction with the accompanying drawings.

BRIEF DESCRIPTION OF THE DRAWINGS

FIGS. 4A to 4F are diagrams useful in explaining an emission state transition of the matrix display input section, schematically showing operations in a random loop mode of the performance apparatus, in which FIG. 4A shows an emission state in the case where a first ball has been designated, FIG. 4B shows an emission state in the case where a second ball has been designated, FIG. 4C shows an emission state in the case where a new ball has been designated, FIG. 4D shows an emission state in the case where a moving ball moves, FIG. 4E shows an emission state in the case where the moving ball has reached the position of any designated ball, and FIG. 4F shows an emission state in the case where the moving ball has moved away from the designated ball;

FIGS. 5A to 5H are diagrams useful in explaining an emission state transition of the matrix display input section, schematically showing operations in a two-point loop mode of the performance apparatus, in which FIG. 5A shows an emission state in the case where a first ball has been designated, FIG. 5B shows an emission state in the case where a second ball has been designated, FIG. 5C shows an emission state in the case where a new ball has been designated, FIG. 5D shows an emission state in the case where a moving ball moves, FIG. 5E shows an emission state in the case where the moving ball has reached the position of any designated ball, FIG. 5F shows an emission state in the case where the moving ball has moved away from the designated ball, and FIG. 5G shows an emission state in the case where the designation of any designated ball has been canceled, and FIG. 5H shows an emission state in the case where a moving route has disappeared;

FIGS. 6A to 6D are diagrams useful in explaining an emission state transition of the matrix display input section, schematically showing operations in a reflecting mode of the performance apparatus, in which FIG. 6A shows an emission state in the case where the position of a moving ball has matched an outer edge position of the matrix display input section; FIG. 6B shows an emission state in the case where the moving ball is reflected, FIG. 6C shows an emission state in the case where the position of the moving ball has matched another outer edge position of the matrix display input section; FIG. 6D shows an emission state in the case where the moving ball is reflected;

FIGS. 7A to 7D are diagrams useful in explaining an emission state transition of the matrix display input section, schematically showing operations in the case where a rotating mode included in moving modes is set in addition to the random loop mode of the performance apparatus, in which FIG. 7A shows an emission state in the case where a rotating instruction has been given, FIG. 7B shows an emission state in the case where the designated balls and a moving ball rotate, FIG. 7C shows an emission state in the case where a rotation stopping instruction has been given, and FIG. 7D shows an emission state in the case where the designated balls and the moving ball have stopped rotating;

FIGS. 8A to 8D are diagrams useful in explaining an emission state transition of the matrix display input section, schematically showing operations in the case where a G sensor mode included in the moving modes is set in addition to the random loop mode, of the performance apparatus, in which FIG. 8A shows an emission state in the case where a moving ball is circulating, FIG. 8B shows an emission state in the case where designated balls and the moving ball shift forward, FIG. 8C shows an emission state in the case where the designated balls and the moving ball shift rightward, and FIG. 8D shows an emission state in the case where the designated balls and the moving ball shift diagonally rearward and rightward;

FIGS. 9A to 9C are conceptual diagrams showing the relationship between the matrix display input section and the whole matrix area in a music box mode of the performance apparatus, in which FIG. 9A shows the case where balls have been designated in the matrix display input section, FIG. 9B shows the case where the whole matrix area is scrolled leftward, and FIG. 9C shows the case where new balls have been designated in the matrix display input section;

FIGS. 10A to 10C are diagrams useful in explaining an emission state transition of the matrix display input section, schematically showing operations in an automatic scrolling mode in the music box mode of the performance apparatus, in which FIG. 10A shows an emission state in the case where a rightward scrolling instruction has been given, FIG. 10B shows an emission state in the case where moving balls associated with respective designated balls move rightward, FIG. 10C shows an emission state in the case where one moving ball has reached the right edge of the matrix display input section.

FIGS. 11A to 11C are transition diagrams schematically showing the relationship between the matrix display input section and the whole matrix area in a manual scrolling mode in the music box mode of the performance apparatus, in which FIG. 11A shows the case where a plurality of balls have been designated on the whole matrix area, FIG. 11B shows the case where one designated ball has reached a sounding column, and FIG. 11C shows the case where another designated ball has reached the sounding column;

DETAILED DESCRIPTION OF THE PREFERRED EMBODIMENTS

The present invention will now be described in detail with reference to the drawings showing a preferred embodiment thereof.

Figure 1:
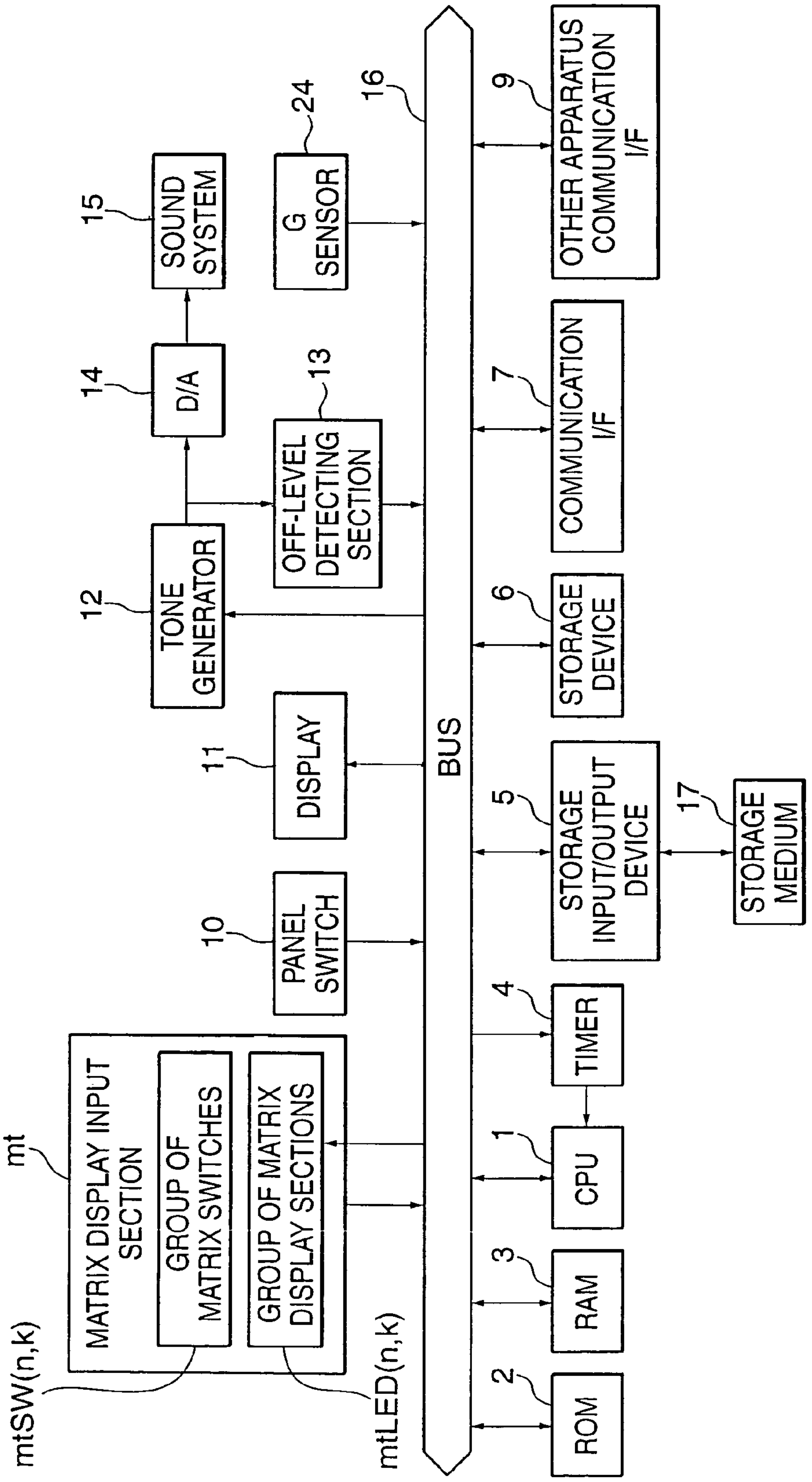
FIG. 1 is a block diagram showing the overall construction of a performance apparatus according to an embodiment of the present invention.
Figure 2:
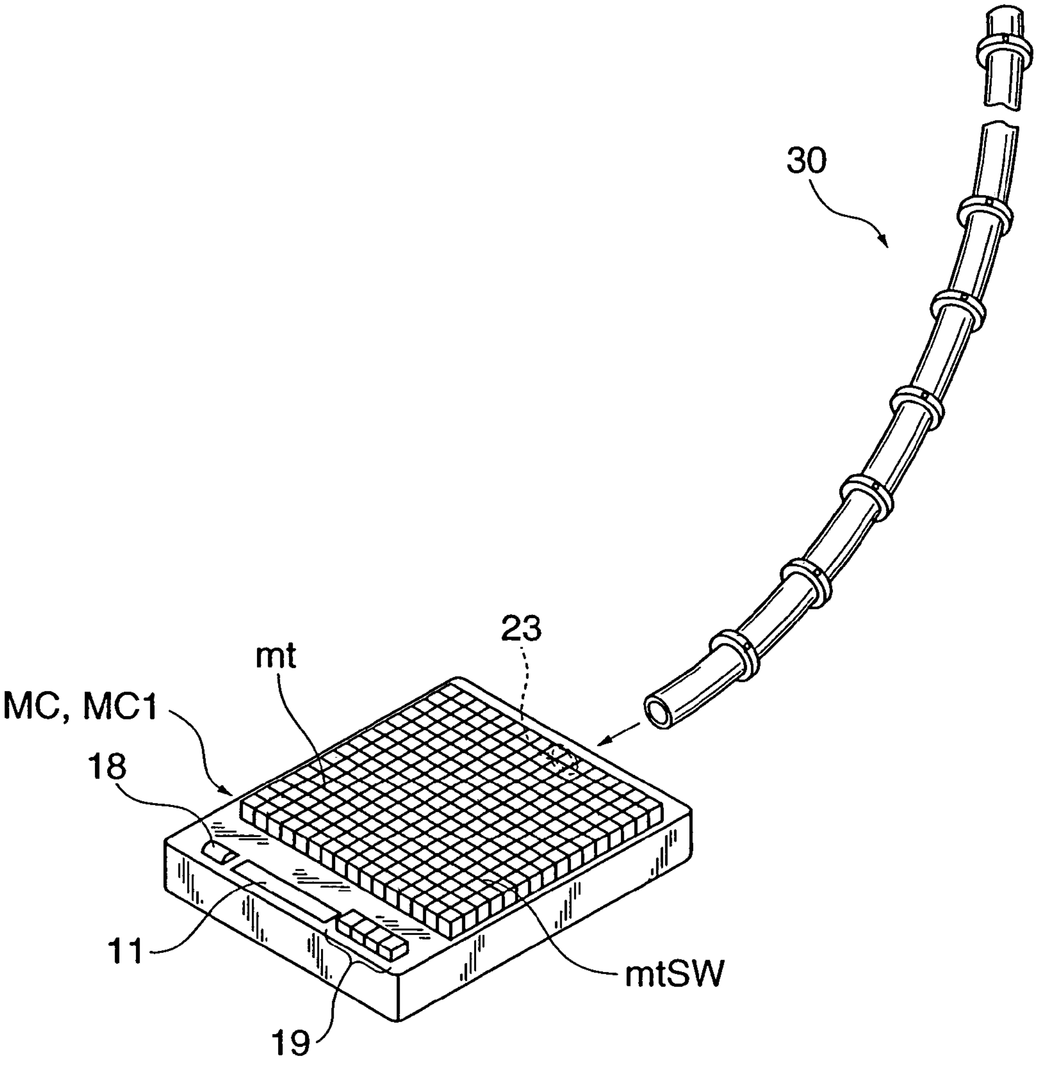
FIG. 2 is a perspective view showing the appearance of the performance apparatus.

FIG. 1 is a block diagram showing the overall construction of a performance apparatus according to an embodiment of the present invention. FIG. 2 is a perspective view showing the appearance of the performance apparatus. A performance system is comprised of two performance apparatuses MC according to the present embodiment connected to each other via a connecting cable 30, so that even a versus game can be executed. In specifically distinguishing between the two performance apparatuses MC In the following description, one will be referred to as "the one's own apparatus MC1" and the other will be referred to as "the opponent's apparatus MC2."

As shown in FIG. 1, the performance apparatus MC is comprised of a ROM 2, a RAM 3, a timer 4, a storage input/output device 5, a storage device 6, communication I/Fs 7, other apparatus communication I/F 8, a matrix display input section mt, a panel switch 10, a display 11, a tone generator 12, an off-level detecting section 13, and a G sensor 24, which are connected to a CPU 1 via a bus 16. A sound system 15 is connected to the tone generator 12 via a D/A converter 14. The timer 4 is connected to the CPU 1.

The CPU 1 controls the overall operation of the performance apparatus MC. The ROM 2 stores control programs executed by the CPU 1, various table data, etc. The RAM 3 temporarily stores performance data, various input information such as text data, various flags, buffer data, computation results, etc. The timer 4 measures an interrupt time for timer interrupt processing and various kinds of time. The storage input/output device 5 writes and reads data to and from a portable storage medium 17 such as a flash memory or a flexible disk. The panel switches 10 such as an operator group 19 and an encoder switch 18 appearing in FIG. 2 consist of a plurality of switches for inputting various information. The display 11 is implemented by an LCD (Liquid Crystal Display) or the like. The storage device 6 stores performance data, various application programs including control programs, and various other data.

The communication I/Fs 7 include a MIDI (Musical Instrument Digital Interface) I/F that performs transmission and reception of MIDI signals to and from other MIDI equipment via a USB (Universal Serial Bus) terminal or the like, a network I/F that performs data communication via the USB and a network such as the Internet, and a wired or wireless LAN (Local Area Network) I/F. An other apparatus communication I/F 9 realizes data communication with the other performance apparatus MC (the opponent's apparatus MC2).

The tone generator 12 converts input performance data or sounding data into musical tone signals. The D/A converter 14 carries out digital-to-analog conversion. The sound system 15 converts musical tone signals input from the D/A converter 14 into sounds and is comprised of an amplifier and a speaker, not shown. The off-level detecting section 13 detects off-level signals from musical tone signals output from the tone generator 12 and supplies the same to the CPU 1. It should be noted that part of the tone generator 12 may be implemented by software. Also, the tone generator 12 should not necessarily be incorporated in the performance apparatus MC, but a tone generator may be additionally provided and connected to the performance apparatus MC, so that a sounding instruction is sent from the performance apparatus MC to the tone generator.

The G sensor 24 detects an acceleration applied to the performance apparatus MC in two-dimensional directions (X-axis and Y-axis), and can be implemented by a commercial acceleration sensor. The G sensor 24 may be comprised of a two axis acceleration sensor or two single axis acceleration sensors disposed at right angles to each other.

As shown in FIG. 2, the matrix display input section mt, display 11, operator group 19, and encoder switch 18 are arranged on an upper surface of the performance apparatus MC, which is box-shaped. A side of the performance apparatus MC where the display 11 is disposed remote from the matrix display input section mt will be referred to as a rear side of the performance apparatus MC, and the user lies at the rear of the performance apparatus MC to operate the performance apparatus MC. In the following description, the front, back, right, and left sides of the performance apparatus MC are those as viewed from the user.

Also, as shown in FIG. 2, a connector 23 is provided at a front end of the performance apparatus MC, for connecting the connecting cable 30 to the performance apparatus MC. Connecting the connecting cable 30 to the connector 23 enables the performance apparatus MC (the one's own apparatus MC1) to carry out data communication with the opponent's apparatus MC2 via the other apparatus communication I/F 9.

Figure 3:
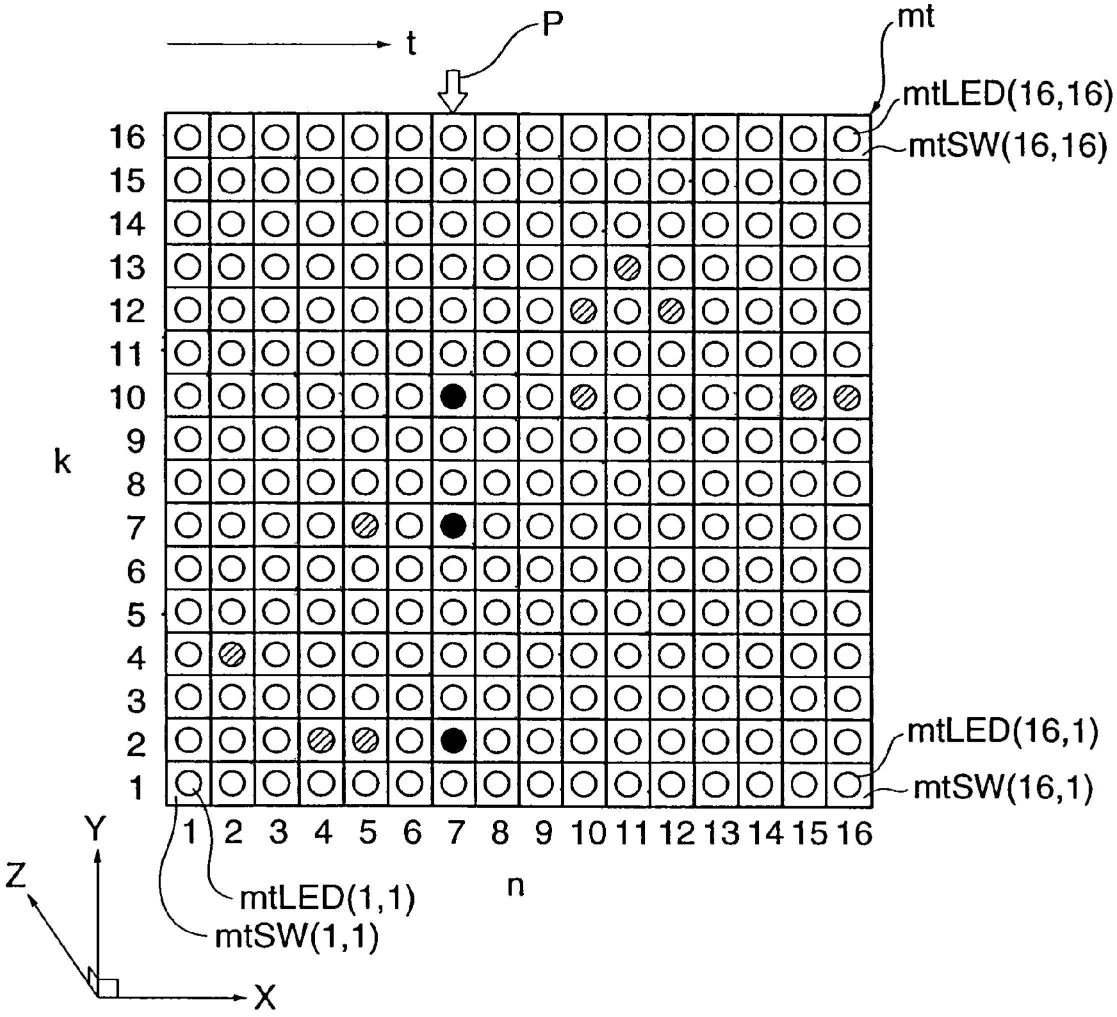
FIG. 3 is a plan view showing a matrix display input section appearing in FIG. 1.

FIG. 3 is a plan view showing the matrix display input section mt. As shown in FIG. 1, the matrix display input section mt is comprised of a matrix switch group mtSW (n, k) consisting of a plurality of matrix switches mtSW, and a matrix display input section group mtLED (n, k) consisting of a plurality of matrix display sections mtLED. As shown in FIG. 3, the matrix display input section mt has a square area, in which 16×16 matrix switches mtSW, i.e. a total of 256 matrix switches mtSW are arranged in a matrix. The matrix switches mtSW are push switches, in which the corresponding matrix display sections mtLED are incorporated. It should be noted that each matrix switch mtSW may be implemented by a panel switch comprised of a touch panel transparent organic EL (Electronic Luminescence). Each matrix display section mtLED is an LED (Light Emitting Diode) having two or more levels of brightness. At least an upper part of each matrix switch mtSW is made of a translucent member so that the emission of the corresponding matrix display section mtLED can be seen.

The matrix display section mtLED of each matrix switch mtSW not only emits light upon depression of the matrix switch mtSW or is extinguished, but also light emission thereof is controlled by processing suitable for various modes executed by the CPU 1, described later.

In the following description, it is assumed that in the matrix display input section mt, the direction of columns (horizontal direction) is along the X-axis, the direction of rows (vertical direction) is along the Y-axis, and the direction vertical to the plane of the matrix display input section mt is along the Z-axis. There are 16 columns along the X-axis, and coordinates thereof are denoted by "n". There are 16 rows along the Y-axis, and coordinates thereof are denoted by "k". Each matrix switch mtSW and its matrix display section mtLED can be represented by XY coordinates, i.e. mtSW (n, k) and mtLED (n, k), respectively. For example, the lowest left matrix switch mtSW and its matrix display section mtLED are represented by mtSW (1, 1) and mtLED (1, 1), respectively.

The CPU 1 is capable of generating sounding data KC in association with respective matrix switches mtSW, and information therefor is stored in e.g. the ROM 2. For example, the sounding data KC is a kind of performance data comprised of a MIDI signal, including musical tone parameters such as pitch, tone color, velocity, and effect(s). In the present embodiment, for example, the pitch of the sounding data KC varies depending on k value (Y coordinate), the tone color (corresponding to musical instrument tone) of the sounding data KC varies from column to column (n value), and other musical tone parameters of the sounding data KC are set to the same values for all the matrix switches mtSW. Pitches corresponding to white keys of a keyboard are associated in order with respective k values; for example, pitch "C4" (central C; 60 in MIDI) for k=1, pitch "D4" for k=2, pitch "E4" for k=3, pitch "F4" for k=4, . . . , pitch "D5" for k=16. It should be noted that pitches associated with the respective k values are not limited to the above-mentioned ones, but may include pitches (e.g. C4#) corresponding to black keys. Also, the tone color may be set to the same value for all the columns (n values).

Each matrix switch mtSW is brought into designated (on) state/undesignated (off) state each time it is depressed by a finger or the like. It may be configured such that each matrix switch mtSW is designated only while it is depressed, and is undesignated while it is not depressed.

A description will now be given of operations in a publicly known "sequential sounding-mode" that has been already realized by the assignee of the present invention. In the sequential sounding mode, processing relating to input acceptance is executed in a "sequential sounding mode input accepting process" in a step S322 in FIG. 16, described later, and processing relating to reproduction (light emission and sounding) is executed in a "sequential sounding mode process" in a step S108 in FIG. 12, described later. In the sequential sounding mode, the matrix display sections mtLED of matrix switches mtSW in the designated state emit light. Each matrix display section mtLED have two levels of brightness as mentioned above; it emits weak light or intense light with a higher brightness than the weak light. In the sequential sounding mode, the matrix display section mtLED does not emit light in the undesignated state, emits weak light in the designated state, and emits intense light at a time point it matches a sounding column P, described later.

For example, referring to FIG. 3, a mark "hatched ○" indicates weak light emitted, and a mark "●: (blackened ○)" indicates intense light emitted. In the sequential sounding mode, the sounding column P moves at a predetermined speed t in order from the (left) first column in response to a predetermined operation. Having passed the sixteenth column, the sounding column P returns to the first column. Thereafter, this sequence is repeated. In the process of the sounding column P's movement, the matrix display sections mtLED of matrix switches mtSW in the designated state in the sounding column P emit intense light. In the example shown in FIG. 3, the matrix display sections mtLED (7, 2), mtLED (7, 7), and mtLED (7, 10) in the seventh column emit intense light. At the same time, sounding data KC corresponding to the matrix switches mtSW in the designated state in the sounding column P is generated, and based on the sounding data KC, a musical tone is generated from the sound system 15. It should be noted that in the sequential sounding mode, the same tone color may be automatically set with respect to all the columns n.

Therefore, by designating desired ones of the matrix switches mtSW arranged in a matrix while regarding the horizontal direction as time and the vertical direction as pitch, the user can compose and reproduce music with ease.

A description will now be given of operations in various operation modes, which are realized by processes of FIGS. 12 to 18B, described later in detail. There are four main operation modes: a "random loop mode", a "two-point loop mode", a "music box mode", and a "sequential sounding mode". Any one of these operation modes is exclusively set. In addition, there are a "reflecting mode" and a "moving mode", but either one of them can be set in addition to the "random loop mode" or "two-point loop mode". The "moving mode" includes a "rotating mode" and a "G sensor mode", and the "music box mode" includes an "automatic scrolling mode" and a "manual scrolling mode". A description will now be given of concrete examples of operations in these operation modes with reference to FIGS. 4A to 11C.

In the present embodiment, the matrix display sections mtLED are circular in plan view and conceptually recognized as emitting balls, and therefore, in the following description, matrix display sections mtLED of the matrix switches mtSW in the designated state will be referred to as "designated balls dp (dp1, dp2, dp3, etc). Also, in the case where matrix display sections mtLED sequentially emit light, this looks as though a light-emitting ball is moving, and therefore, in the following description, such moving light-emitting ball that appears to move will be referred to as "moving ball mp". The "moving ball mp" is defined by one of the matrix display sections mtLED which indicates present position coordinates.

In FIGS. 4A to 11C, the moving ball mp is indicated by a "double circle ◎", and the designated balls dp are indicated by "dotted ○" or "●: blackened ○". The "dotted ○" indicates the designated ball dp which has come out of the light-emitting state because designation thereof has been canceled, it has been displaced, or it has come out of the matrix display input section mt. Further, "●: blackened ○" indicates a matrix display section mtLED that emits intense light (it may include a designated ball dp and a moving ball mp).

Figure 4A:
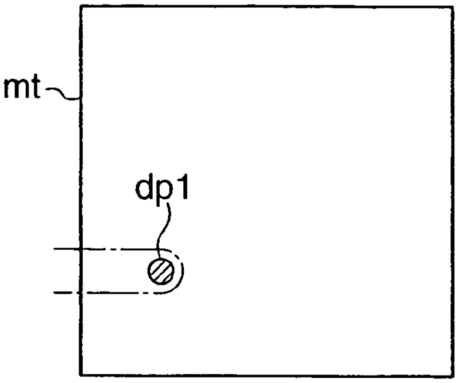
Figure 4B:
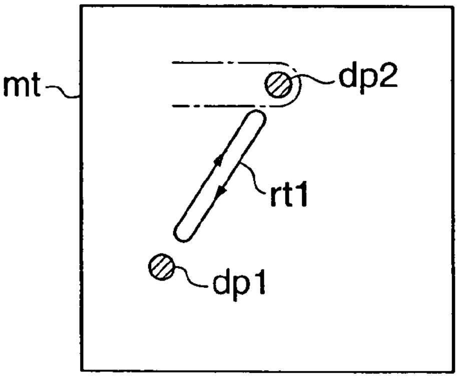
Figure 4C:
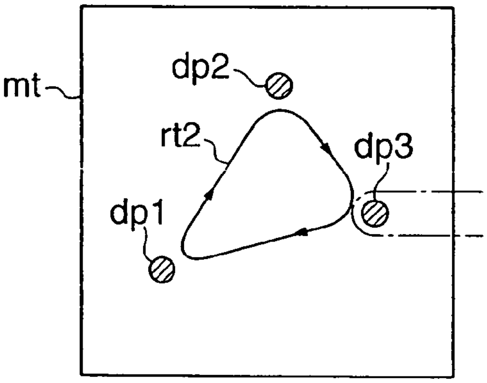
Figure 4D:
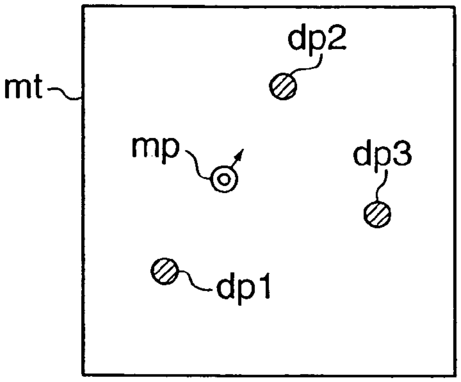
Figure 4E:
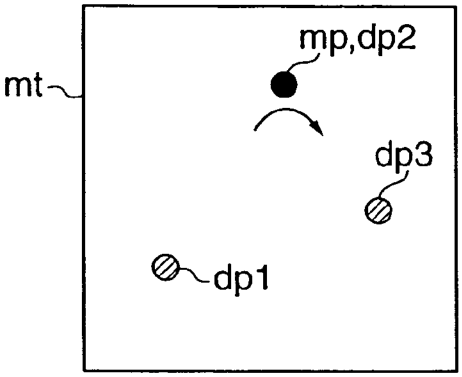
Figure 4F:
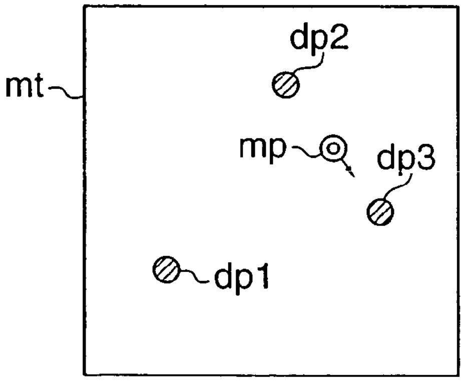

FIGS. 4A to 4F are diagrams useful in explaining an emission state transition of the matrix display input section, schematically showing operations in the "random loop mode" of the performance apparatus, in which FIG. 4A shows an emission state in the case where a first ball has been designated, FIG. 4B shows an emission state in the case where a second ball has been designated, FIG. 4C shows an emission state in the case where a new ball has been designated, FIG. 4D shows an emission state in the case where a moving ball moves, FIG. 4E shows an emission state in the case where the moving ball has reached the position of any designated ball, and FIG. 4F shows an emission state in the case where the moving ball has moved away from the designated ball.

Typically, in the random loop mode, first, a desired one matrix switch mtSW is designated (on) by a finger or the like to generate a moving ball mp (which is initially at a standstill), and then two or more matrix switches mtSW are designated (on) to generate a moving route rt (rt1, rt2, etc.) for the generated moving ball mp.

Figure 15A:
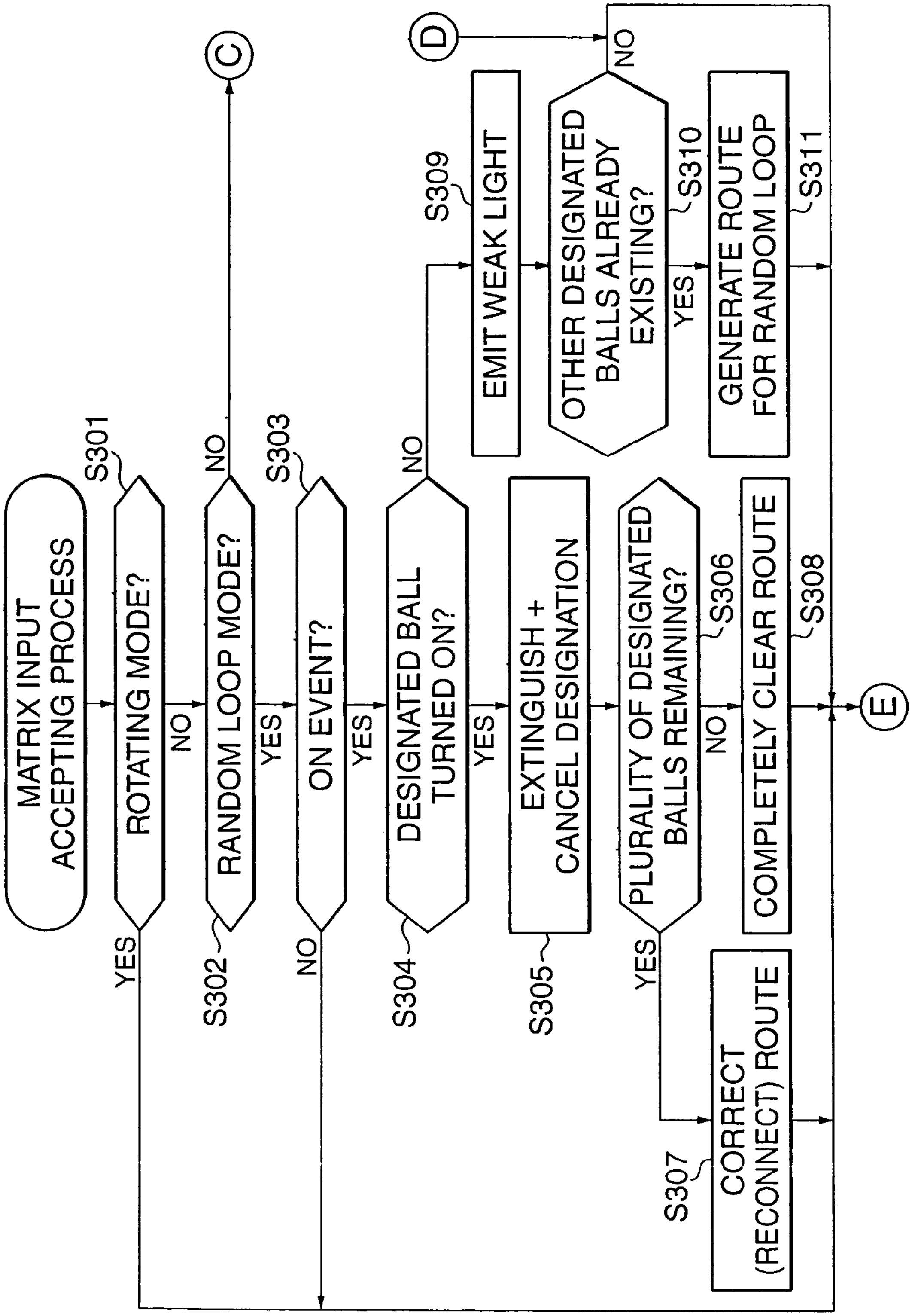
FIGS. 15A and 15B are flow charts showing a matrix input accepting process.

Specifically, as shown in FIG. 4A, when a first ball dp1 is designated, it emits weak light, and a musical tone corresponding to the coordinates thereof is continuously sounded (step S303→step S304→step S309 in FIG. 15A). When a second ball dp2 is designated, it also emits weak light and a moving route rt1 is generated. At the same time, the continuous sounding of the musical tone is stopped (FIG. 4B and step S309→S310→S311 in FIG. 15A).

Here, the moving route rt1 is set to be a to-and-fro route on a straight line with the shortest distance between the designated balls dp1 and dp2. Actually, any matrix display section mtLED does not always exist on the straight line, and hence the matrix display section mtLED closest to the straight line is selected to form a substantially straight route. At the same time when the moving route rt1 is generated, a moving ball mp is generated. In the present embodiment, the moving ball mp is generated at the same position as the latest designated ball dp2, but may be generated at the position of any other designated ball dp (for example, the oldest designated ball dp; the designated ball dp1 in this example).

Figure 12:
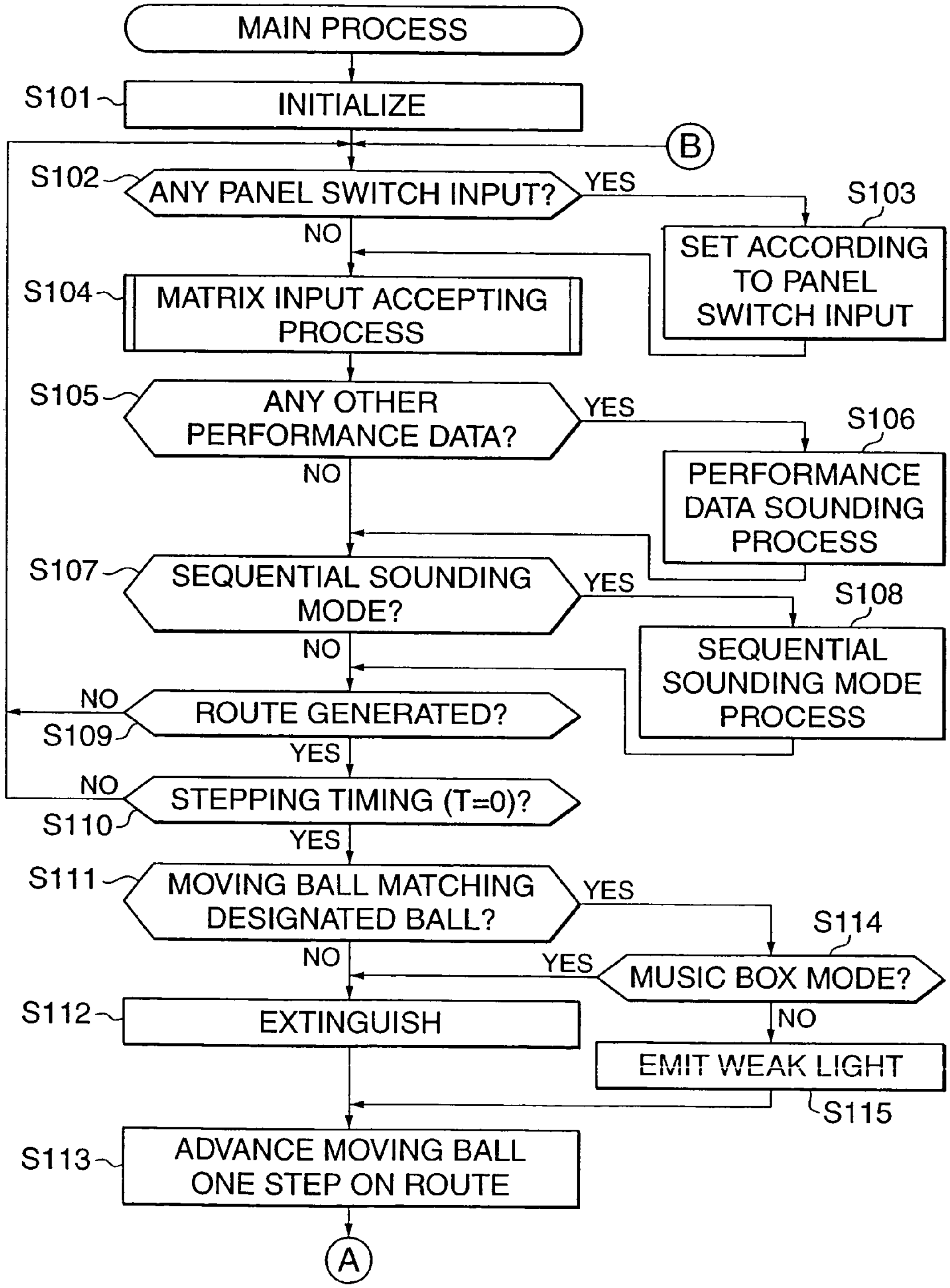
FIG. 12 is a flow chart showing a main process carried out by the performance apparatus.

The moving ball mp only moves to and fro between the designated balls dp1 and dp2 insofar as a new designated ball dp is not designated or designation is not canceled (steps S109 to S113 in FIG. 12). As shown in FIG. 4C, however, when a new ball dp3 is designated, it emits weak light and a moving route is generated again, so that the original moving route rt1 disappears and a new moving route rt2 is generated (step S309→S310→S311 in FIG. 15A). The moving route rt2 is a triangular route along which the moving ball mp circulates through the designated balls dp1, dp2 and dp3 in the designated order. In this case, when direction of the moving ball mp matches the moving direction defined by the moving route rt2, the moving ball mp becomes a moving ball mp moving on the moving route rt2. It may be configured such that each time a new ball dp is designated, the original moving ball mp disappears and a moving ball mp is generated again at the new designated ball dp3.

Although also in the case where four or more designated balls dp are designated, the moving route rt is set such that the moving ball mp circulates in the designated order, the present invention is not limited to this, a moving route rt may be formed as a polygonal annular route which has no portions intersecting with each other and circulate in a predetermined direction.

Then, as shown in FIG. 4D, the moving ball mp moves on the moving route rt2 toward the designated ball dp2 (steps S109 to S113 in FIG. 12). The undesignated matrix display sections mtLED which the moving ball mp passes on the way sequentially emit weak light (step S123 in FIG. 3), and the matrix display sections mtLED which the moving ball mp has passed are sequentially turned off (step S112 in FIG. 13).

Figure 13:
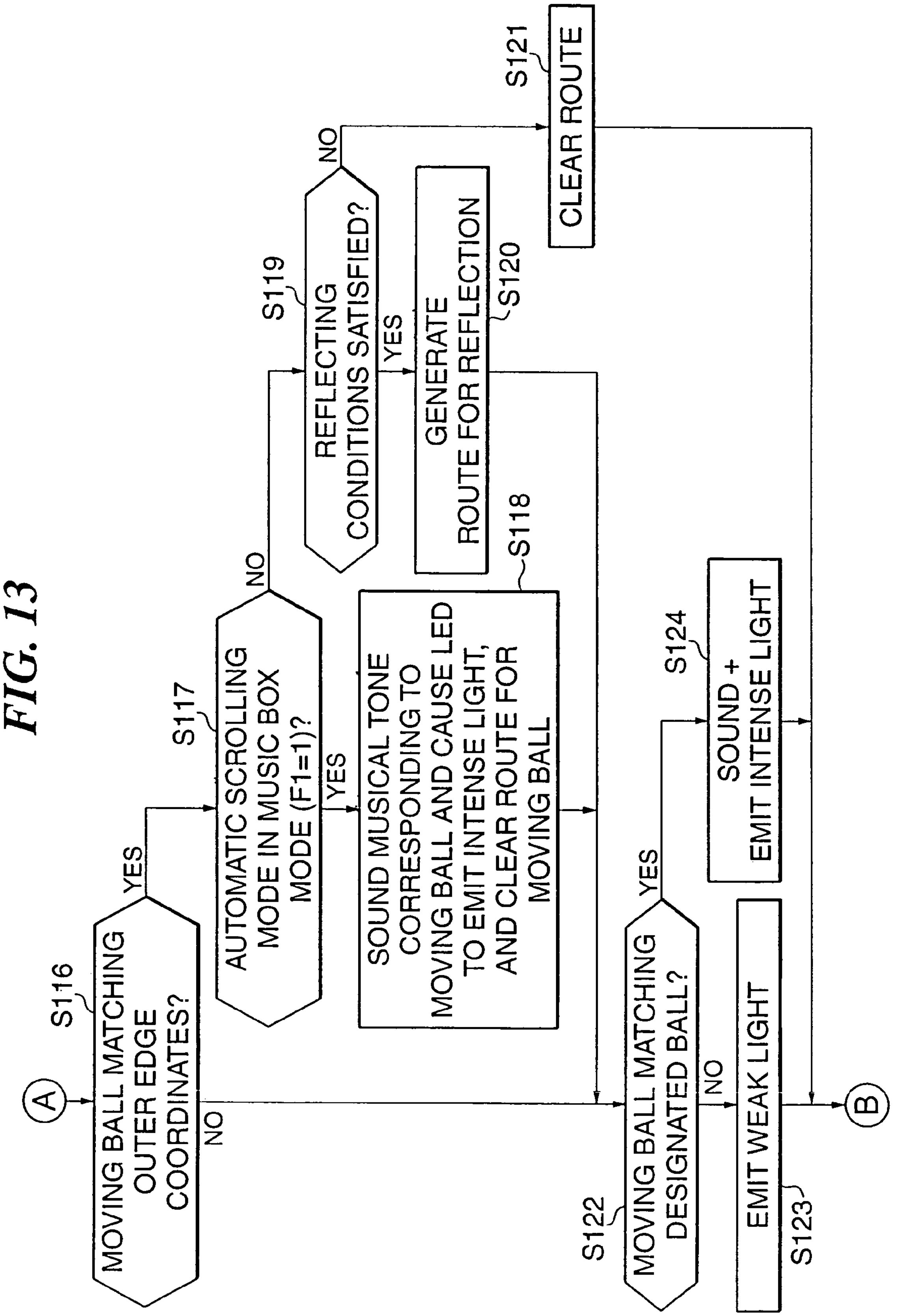
FIG. 13 is a flow chart showing a continued part of the main process in FIG. 12.

Then, when the moving ball mp has reached any designated ball dp, e.g. when the moving ball mp has matched the designated ball dp2 as shown in FIG. 4E, the designated ball dp2 emits intense light and a corresponding musical tone is sounded (step S113→S116→S122→S124 in FIGS. 12 and 13). The moving ball mp changes its direction to follow the moving route rt2 (step S113). The sounding on this occasion is based on sounding data KC corresponding to the coordinates of the designated ball dp2.

When the moving ball mp moves away from the designated ball dp2, the designated ball dp2 is caused to emit weak light again (step S115 in FIG. 12). Then, the moving ball mp moves toward the designated ball dp3 (FIG. 4F). It should be noted that designation of a designated ball bp may be arbitrarily canceled, and in this case, the designated ball dp is extinguished (steps S304 and S305 in FIG. 15A).

By the way, in the random loop mode, the moving ball mp moves between a plurality of designated balls dp, which are collectively referred to as "group". In the present embodiment, the number of designated balls dp in a group is not limited, but there is only one moving ball mp for one group. It should be noted that a plurality of moving balls mp may be generated for one group. Also, a plurality of (e.g. eight) groups may be controlled at the same time, and in this case, processing in the random loop mode is performed for each of the groups. Also, parameters such as tone color, pitch, and tempo may be separately set with respect to each of the groups.

Figure 5A:
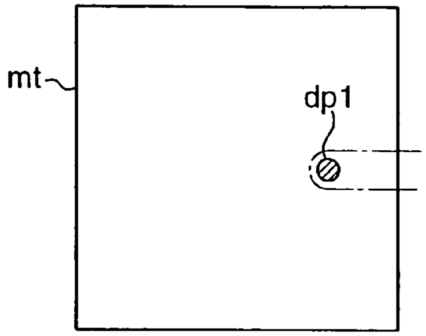
Figure 5B:
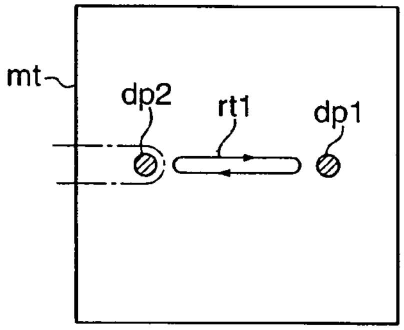
Figure 5C:
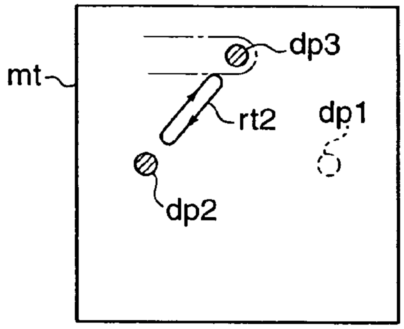
Figure 5D:
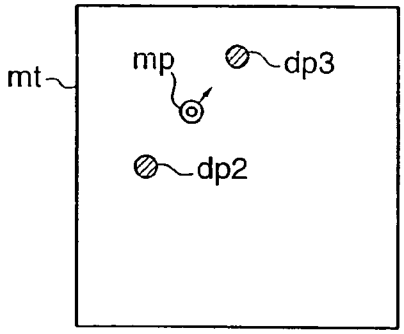
Figure 5E:
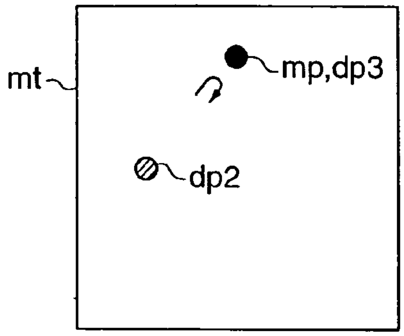
Figure 5F:
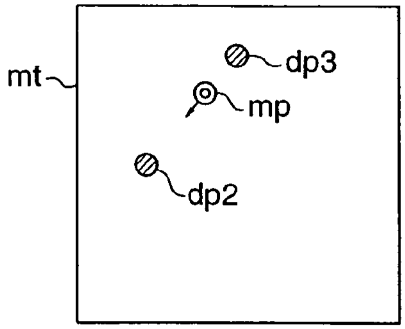
Figure 5G:
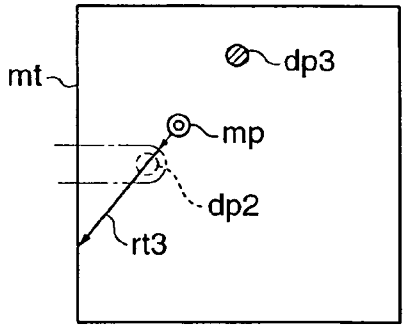
Figure 5H:
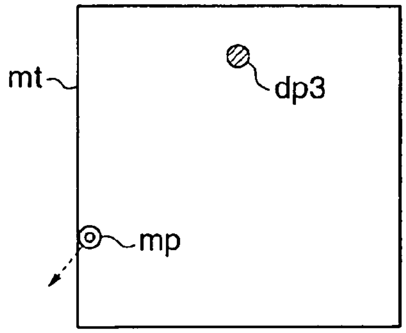

FIGS. 5A to 5H are diagrams useful in explaining an emission state transition of the matrix display input section, schematically showing operations in the two-point loop mode of the performance apparatus, in which FIG. 5A shows an emission state in the case where a first ball has been designated, FIG. 5B shows an emission state in the case where a second ball has been designated, FIG. 5C shows an emission state in the case where a new ball has been designated, FIG. 5D shows an emission state in the case where a moving ball moves, FIG. 5E shows an emission state in the case where the moving ball has reached the position of any designated ball, FIG. 5F shows an emission state in the case where the moving ball has moved away from the designated ball, and FIG. 5G shows an emission state in the case where the designation of any designated ball has been canceled, and FIG. 5H shows an emission state in the case where a moving route has disappeared. Particularly in the example shown in FIGS. 5A to 5H, the "reflecting mode" and the "moving mode" are not set.

Except for operations relating to generation of musical tones, settings and operation in the two-point loop mode are the same as those in the random loop mode up to a stage where the second designated ball dp is designated. Specifically, as shown in FIG. 5A, when a first ball dp1 is designated, it emits weak light (step S318→S324→S325 in FIG. 16). Then, when a second ball dp2 is designated, it emits weak light and a moving route rt1 is generated (FIG. 5B and step S318→S324→S325→S326→S327 in FIG. 16).

As is distinct from the random loop mode, a musical tone is not sounded by merely depressing one matrix display input section mt in the two-point loop mode. Here, how the moving route rt1 is set and how a moving ball mp is generated at the same time when the moving route rt1 is generated are the same as those in the example shown in FIG. 4B.

As shown in FIG. 5C, when a third ball dp3 is newly designated, the oldest designated ball dp1 is extinguished and the designation of the designated ball dp1 is canceled to correct the moving route rt. As a result, the moving route rt1 disappears, and a new moving route rt2 is generated between the designated balls dp2 and dp3 (step S327 in FIG. 16). In this case, the moving ball mp which has been moving on the moving route rt1 goes out of the matrix display input section mt to disappear as in the examples shown in FIGS. 5G and 5H, described later. On the other hand, a moving ball mp is generated again, for example, at the position of the designated ball dp3 on the moving route rt2.

It should be noted that two designated balls dp constituting a two-point loop is referred to as a "two-point loop set". Although in the present embodiment, the number of "two-point loop sets" that can be generated at the same time is limited to one, the present invention is not limited to this, but a plurality of "two-point loop sets" may be generated at the same time in the matrix display input section mt. In this case, even when the third designated ball dp3 is designated in the state shown in FIG. 5B, the moving route rt1 that has already been generated does not disappear, and the designation of the oldest designated ball dp1 is not canceled. Specifically, the newly designated third designated ball dp3 is regarded as the first designated ball dp constituting the second "two-point loop set", and thereafter, when a second ball dp4 is newly designated, the designated balls dp3 and dp4 form the second "two-point loop set", and a new moving route rt different from the moving route rt1 is generated between the designated balls dp3 and dp4.

Then, as shown in FIGS. 5D to 5F, the moving ball mp moves back and forth between the designated balls dp2 and dp3 on the moving route rt2. On this occasion, on the moving route rt2, undesignated matrix display sections mtLED sequentially emit weak light as the moving ball mp passes them, and after the moving ball mp has passed them, they are sequentially extinguished (steps S109 to S115 in FIG. 12), and when the moving ball mp reaches the position of any designated ball dp, the designated ball dp emits intense light and a corresponding musical tone is sounded (step S113→S116→S122→S124 in FIGS. 12 and 13), and the moving ball mp changes its direction to follow the moving route rt2 (step S113 in FIG. 12) as is the case with the above described example in the random loop mode shown in FIGS. 4D and 4F.

Then, as shown in FIG. 5G, when the designation of the designated ball dp2 is canceled in the state in which the moving ball mp is moving toward the designated ball dp2 on the moving route rt2, the designated ball dp2 is extinguished and the designation thereof is canceled to correct the moving route rt. As a result, the moving route rt2 disappears, and a new moving route rt3 which extends from the designated ball dp2 is generated (step S328→S329→S330 in FIG. 16). At this time point, the moving ball mp continues to move on the moving route rt3 without disappearing. Further, since the reflecting mode is not set here, the moving route rt3 disappears, and the moving bail mp also goes out of the matrix display input section mt on a route which is an extension of the moving route rt3 and disappears as shown in FIG. 5H (step S116→S117→S119→S121 in FIG. 13).

Figure 6A:
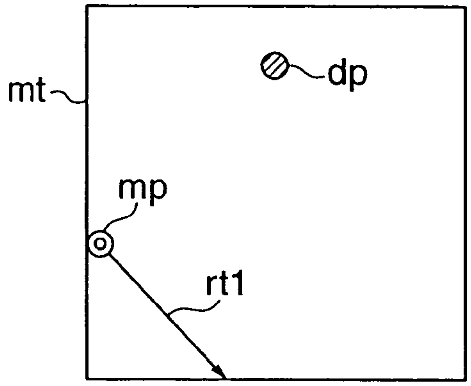
Figure 6C:
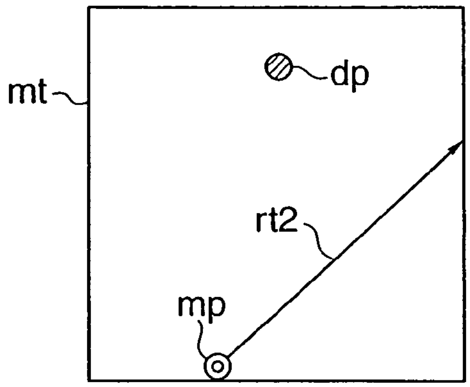
Figure 6B:
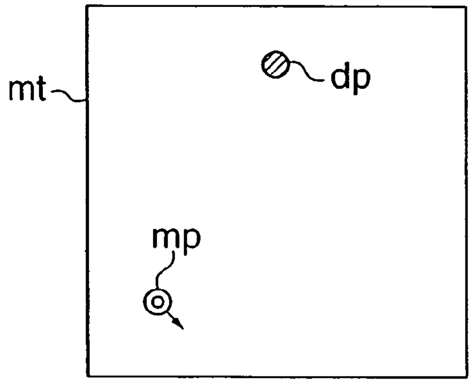
Figure 6D:
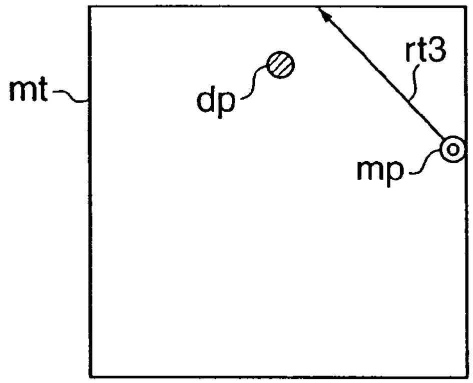

FIGS. 6A to 6D are diagrams useful in explaining an emission state transition of the matrix display input section, schematically showing operations in the reflecting mode of the performance apparatus, in which FIG. 6A shows an emission state in the case where the position of a moving ball has matched an outer edge position of the matrix display input section; FIG. 6B shows an emission state in the case where the moving ball is reflected, FIG. 6C shows an emission state in the case where the position of the moving ball has matched an outer edge position of the matrix display input section; FIG. 6D shows an emission state in the case where the moving ball is reflected.

As mentioned above, the reflecting mode can be set in the random loop mode or the two-point loop mode. FIGS. 6A to 6D show an example in which one designated ball dp remains. It may be configured such that the reflecting mode is set independently of the random loop mode or the two-point loop mode; for example, even when there is no designated ball dp, a moving ball mp and a moving route rt therefor is generated to enable reflection of the moving ball mp.

First, as shown in FIG. 6A, the moving ball mp moves to a left outer edge of the matrix display input section mt, i.e. outer edge coordinates (the column of n=1) (as is the case with the example shown in FIG. 5H), a moving route rt1 for reflection is generated if "predetermined reflecting conditions" are satisfied since the reflecting mode is set in this case (step S116→S117→S119→S120 in FIG. 13).

As a result, at the left edge of the matrix display input section mt, the moving ball mp is reflected inward at e.g. the same angle as the incident angle (FIG. 6B). The "predetermined reflecting conditions" include, for example, the condition that the number of times the same moving ball mp has been reflected is not greater than a predetermined number of times, as well as the condition that the reflecting mode is set. The "predetermined reflecting conditions" may be arbitrarily changed. The predetermined reflecting conditions may be set such that the reflection of the moving ball mp is endlessly continued until the user instructs to stop the reflection, or is stopped when the moving ball mp matches a designated ball dp.

Similarly, when the moving ball mp matches lower outer edge coordinates (the row of k=1) of the matrix display input section mt, a moving route rt 2 for reflection is generated (step S120 in FIG. 13) (FIG. 6C), and the moving ball mp is reflected. Further, when the moving ball mp matches right outer edge coordinates (the column of n=16), a moving route rt3 is generated, and the moving ball mp is reflected (FIG. 6D). The original moving route rt disappears when the moving route rt2 and the moving route rt3 are generated.

Figure 7A:
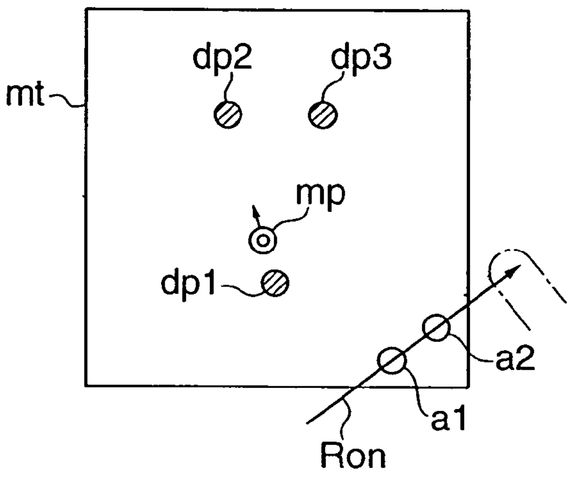
Figure 7C:
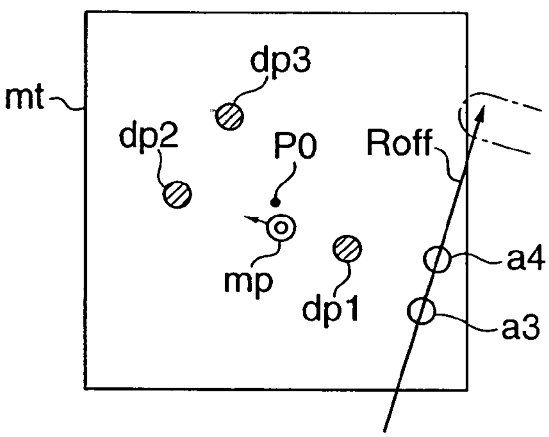
Figure 7B:
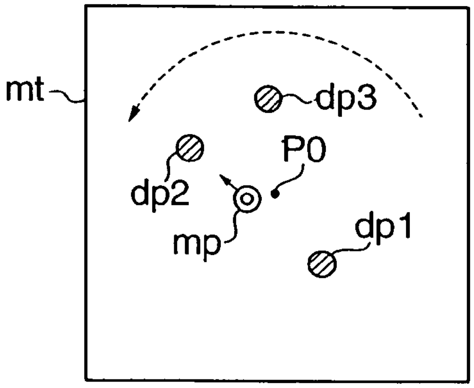
Figure 7D:
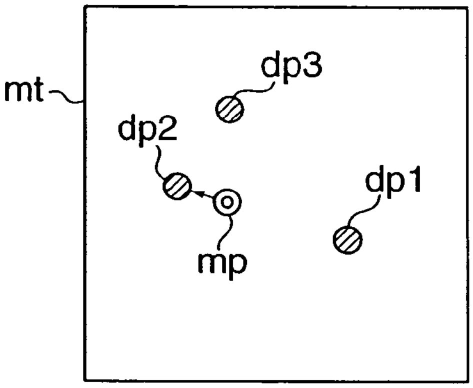

FIGS. 7A to 7D are diagrams useful in explaining an emission state transition of the matrix display input section, schematically showing operations in the case where the rotating mode among the moving modes is set in addition to the "random loop mode." in the performance apparatus, in which FIG. 7A shows an emission state in the case where rotation is instructed, FIG. 7B shows an emission state in the case where designated balls and a moving ball rotate, FIG. 7C shows an emission state in the case where a rotation stopping instruction has been given, and FIG. 7D shows an emission state in the case where the designated balls and the moving ball have stopped rotating.

In the random loop mode, when a rotating instruction Ron is given as shown in FIG. 7A in the state in which a moving ball mp is circulating through designated balls dp1, dp2, and dp3 (as is the case with the example shown in FIGS. 4D to 4F), the rotational center P0 is found by computation as shown in FIG. 7B. A figure (triangle in this example) formed by a group consisting of the designated balls dp1, dp2, and dp3 and the moving ball mp rotates about the rotational center P0 in a direction designated by the rotating instruction Ron (counter-clockwise direction) (step S401→S402→S405→S406→S407 in FIG. 17).

That is, the designated balls dp1, dp2, and dp3 and the moving ball mp rotate while maintaining their relative positional relationship. On this occasion, a moving route rt between the designated balls dp1, dp2, and dp3 rotates, too, and therefore, in the meantime, the moving ball mp continues to move on the moving route rt. In the following description, the figure that rotates or shifts in unison in the moving modes (including the G sensor mode) will be referred to as "the group figure".

Here, the rotating instruction such as the rotating instruction Ron can be given by continuously depressing at least two arbitrary matrix switches mtSW in a predetermined period of time. For example, the user has only to run his/her finger across the matrix display input section mt at an end thereof, and the rotational direction is determined as being a clockwise direction or a counterclockwise direction by the two matrix switches mtSW turned on last.

For example, in the example shown in FIG. 7A, the counterclockwise direction is designated by the matrix switches mtSW at two points: a point a1 turned on first and a point a2 turned on later (last) among the matrix switches mtSW. Also, a difference in turning-on time between such two points defines the rotational speed of the group figure. It should be noted that the rotational speed may be constant. The rotational direction should not necessarily be given in the above-mentioned manner, but may be given by an instruction input through the panel switch 10 or the like.

The rotational center P0 does not have to be positioned at any coordinates of the matrix switches mtSW since it is a virtual point corresponding to the center of gravity of the group figure. The trace followed by each designated ball dp when the group figure is rotating is circular by computation, but actually, the designated ball dp passes matrix display sections mtLED close to the circular trace.

Figure 17:
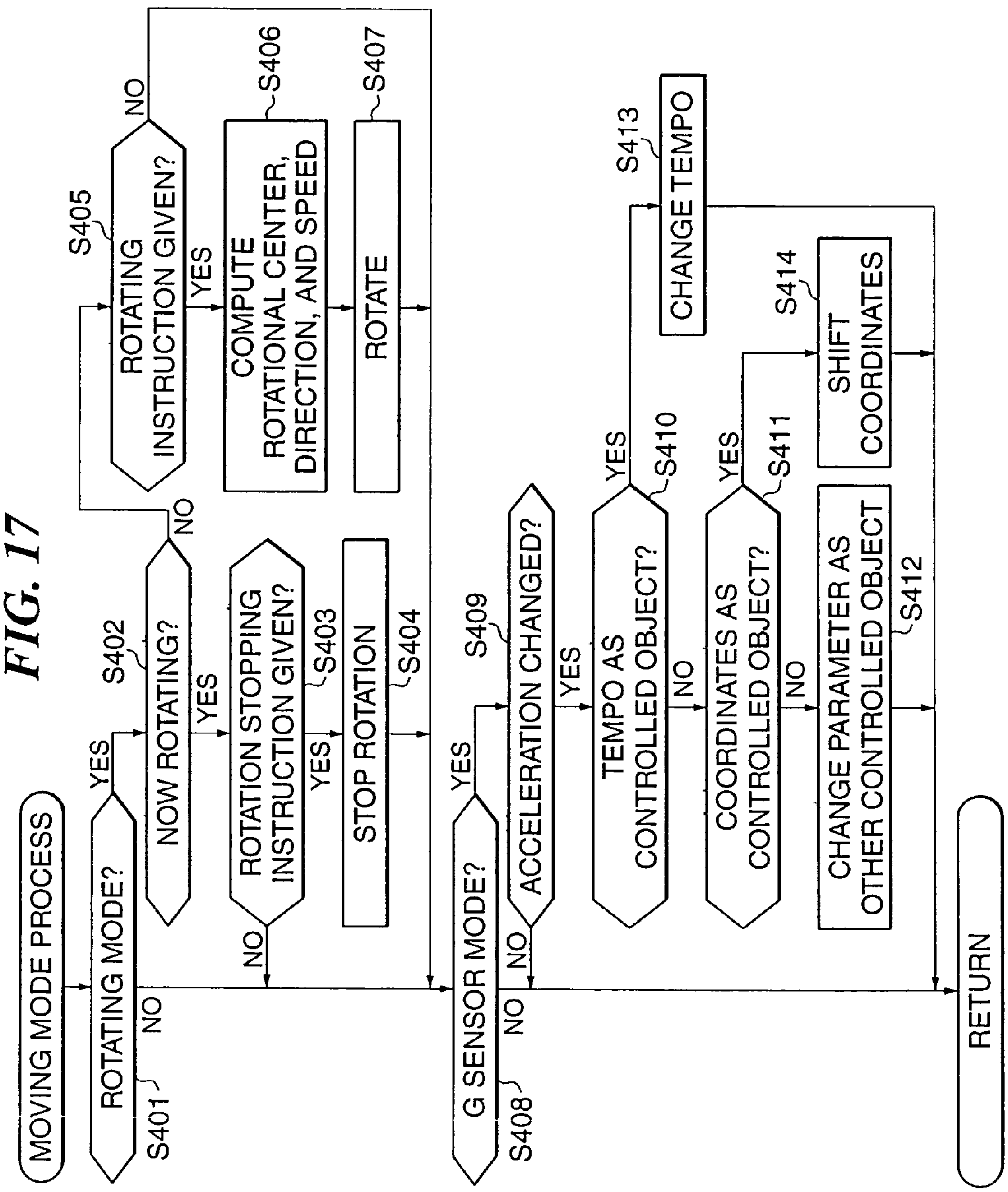
FIG. 17 is a flow chart showing a moving mode process.

On the other hand, when a rotation stopping instruction Roff is given as shown in FIG. 7C while the group figure is rotating counterclockwise as shown in FIG. 7B, the group figure stops rotating (FIG. 7D and step S401→S402→S403→S404 in FIG. 17). The moving route rt stops rotating, too, but the moving ball mp continues to move on the moving route rt.

Here, the way of giving the rotation stopping instruction such as the rotation stopping instruction Roff is the same as the way of giving the rotating instruction as shown in FIG. 7A; i.e. the finger is run across the matrix display input section mt in the same direction as the rotational direction of the group figure. For example, in the example shown in FIG. 7C, the rotation stopping instruction is given by two points: a point a3 turned on first and a point a4 turned on later. It may be configured such that the group figure rotates in the opposite direction when the user runs his/her finger across the matrix display input section mt in a direction opposite to the rotational direction of the group figure.

Figure 8A:
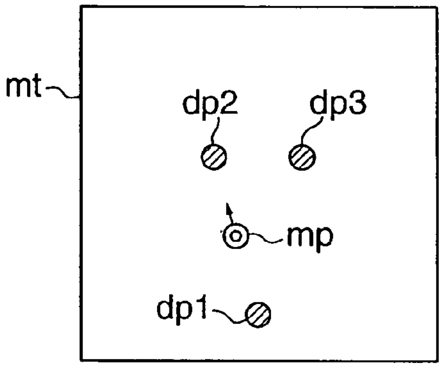
Figure 8C:
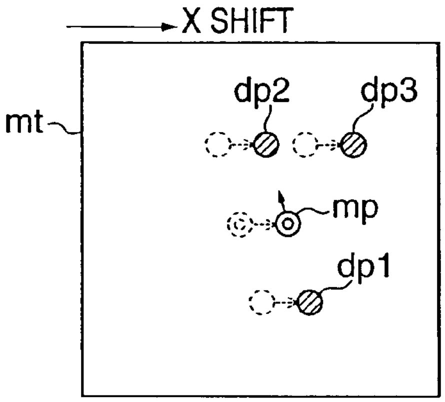
Figure 8B:
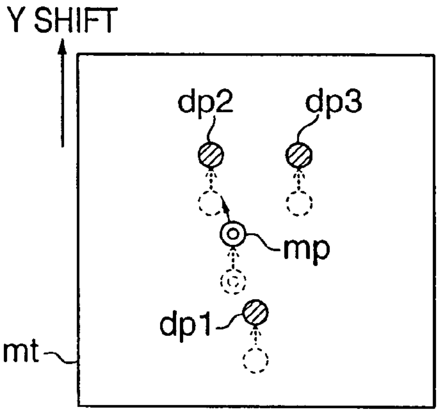
Figure 8D:
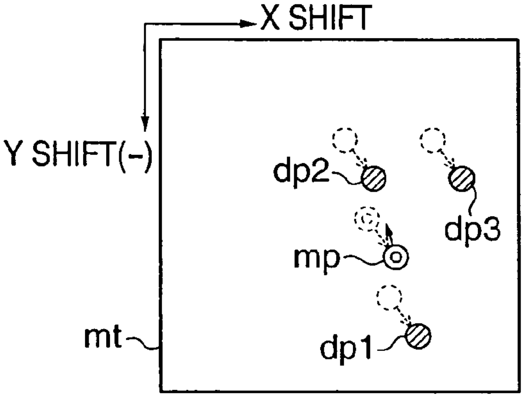

FIGS. 8A to 8D are diagrams useful in explaining an emission state transition of the matrix display input section, schematically showing operations in the case where the G sensor mode included in the moving modes is set in addition to the random loop mode in the performance apparatus, in which FIG. 8A shows an emission state in the case where a moving ball is circulating, FIG. 8B shows an emission state in the case where designated balls and the moving ball shift forward, FIG. 8C shows an emission state in the case where the designated balls and the moving ball shift rightward, and FIG. 8D shows an emission state in the case where the designated balls and the moving ball shift diagonally rearward and rightward.

The controlled object relating to the G sensor mode can be arbitrarily set in the above-mentioned step S103 in FIG. 12; for example, tempo, coordinates of the group figure, and other parameters can be set as the controlled object. For example, in the case where the controlled object is coordinates, designated balls dp or moving ball mp shifts based on changes in accelerations in the X-axis and the Y-axis. The accelerations in the X-axis and the Y-axis occur not only when the performance apparatus MC is moved and stopped in either of the directions of the X-axis and the Y-axis, but also when the performance apparatus MC is tilted under gravity.

In the present embodiment, when the performance apparatus MC is tilted a predetermined amount or more at a predetermined speed or higher in the direction of the width as viewed from the user (when the performance apparatus MC is rotated rightward or leftward about the Y-axis), the group figure moves (shifts) rightward or leftward, and when the performance apparatus MC is tilted a predetermined amount or more at a predetermined speed or higher in the direction of the depth as viewed from the user (when the performance apparatus MC is rotated about the X-axis in such a direction that the front of the performance apparatus MC goes down or up), the group figure is controlled to move forward or backward.

For example, in the case where the controlled object is coordinates, the front of the performance apparatus MC is tilted in the state in which a moving ball mp circulates through designated balls dp1, dp2, and dp3 in the random loop mode as shown in FIG. 8A (as is the case with the example shown FIGS. 4D to 4F). If a change in acceleration (in the direction of the Y-axis) caused by tilting the front of the performance apparatus MC is not less than a predetermined value, the group figure formed by the designated balls dp1 to dp3 and the moving ball mp (including a moving route rt) shifts forward (step S408→S409→S410→S411→S414 in FIG. 17).

That is, the designated balls dp1 to dp3 and the moving ball mp shift forward while maintaining their relative positional relationship. On this occasion, the moving route rt between the designated ball dp1 to dp3 shifts, too, and hence the moving ball mp continues to move on the moving route rt even after the shift. When the rotation of the performance apparatus MC is stopped, the group figure stops moving because there is no change in acceleration in the direction of the Y-axis.

Similarly, when the performance apparatus MC is tilted rightward as viewed from the user, the group figure shifts rightward as shown in FIG. 8C if a change in acceleration in the direction of the X-axis is not less than a predetermined value (step S414). Further, when the right and back of the performance apparatus MC are tilted downward, the group figure shifts diagonally backward and rightward as shown in FIG. 8D if changes in accelerations in the directions of the X-axis and the Y-axis are not less than a predetermined value.

It should be noted that in the "moving mode" as well, the moving ball mp continues to move on the moving route rt after the group figure has stopped rotating or shifting (steps S109 to S115 and S122 to S124 in FIG. 12).

Figure 9A:
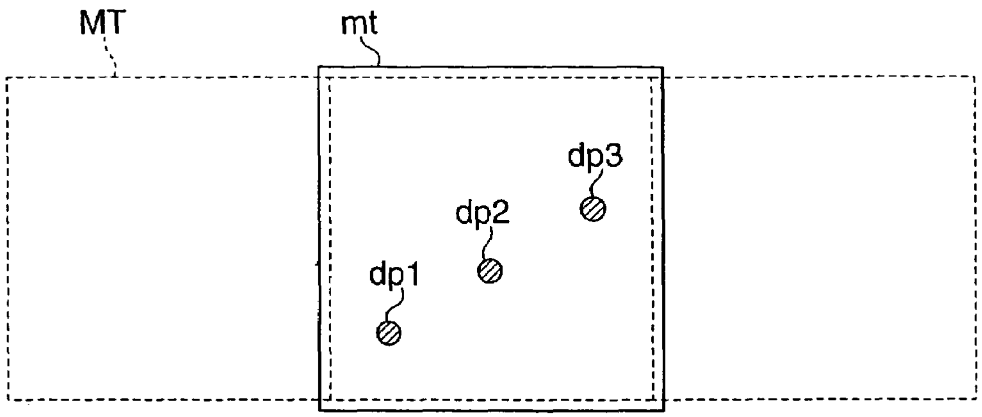
Figure 9B:
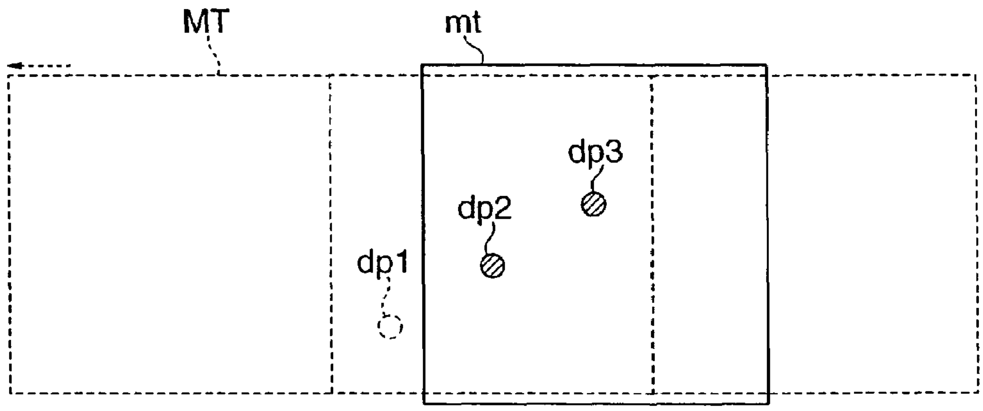
Figure 9C:
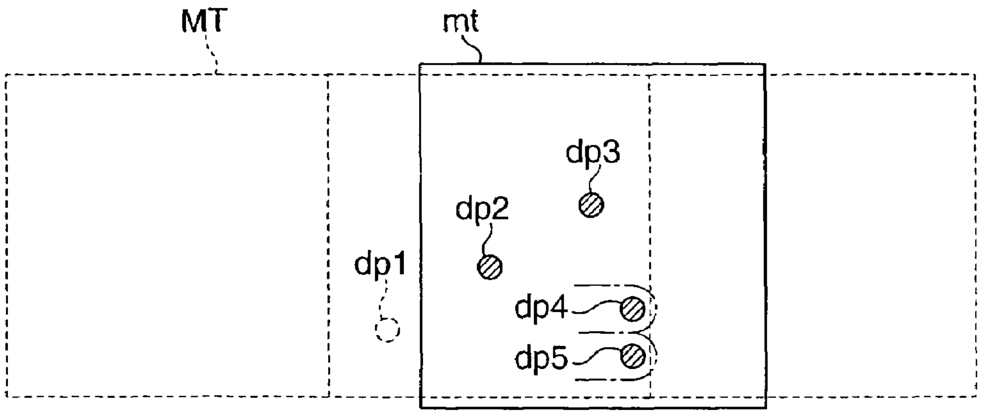

FIGS. 9A to 9C are conceptual diagrams showing the relationship between the matrix display input section and the whole matrix area in the "music box mode" of the performance apparatus, in which FIG. 9A shows the case where balls have been designated in the matrix display input section, FIG. 9B shows the case where the whole matrix area is scrolled leftward, and FIG. 9C shows the case where a new ball has been designated in the matrix display input section. In the music box mode, balls dp are designated and stored with respect to not only coordinates within the matrix display input section mt but also coordinates in the whole matrix area MT. The whole matrix area MT has 16 rows along the Y-axis as is the case with the matrix display input section mt, but has 48 rows along the X-axis, which is three times as many as those of the matrix display input section mt. Therefore, the whole matrix area MT has an area equivalent to three pages of matrix display input sections mt in the direction of the width.

In the music box mode, the whole matrix area MT can be manually scrolled by, for example, rotating the encoder switch 18, and the user can see designated balls dp and a moving ball mp existing in part of the whole matrix area MT which corresponds to the matrix display input section mt. In the music box mode, designation of balls dp can be accepted only in the matrix display input section mt as is the case with the other operation modes, but designated balls dp which have got out of the matrix display input section mt as a result of scrolling can appear again in the matrix display input section mt when scrolled because information on their coordinates is stored. Designation of balls dp and cancellation thereof can be performed if the "automatic scrolling mode" is not set. In the music box mode, each processing is performed on a row (k) to row basis.

Figure 18A:
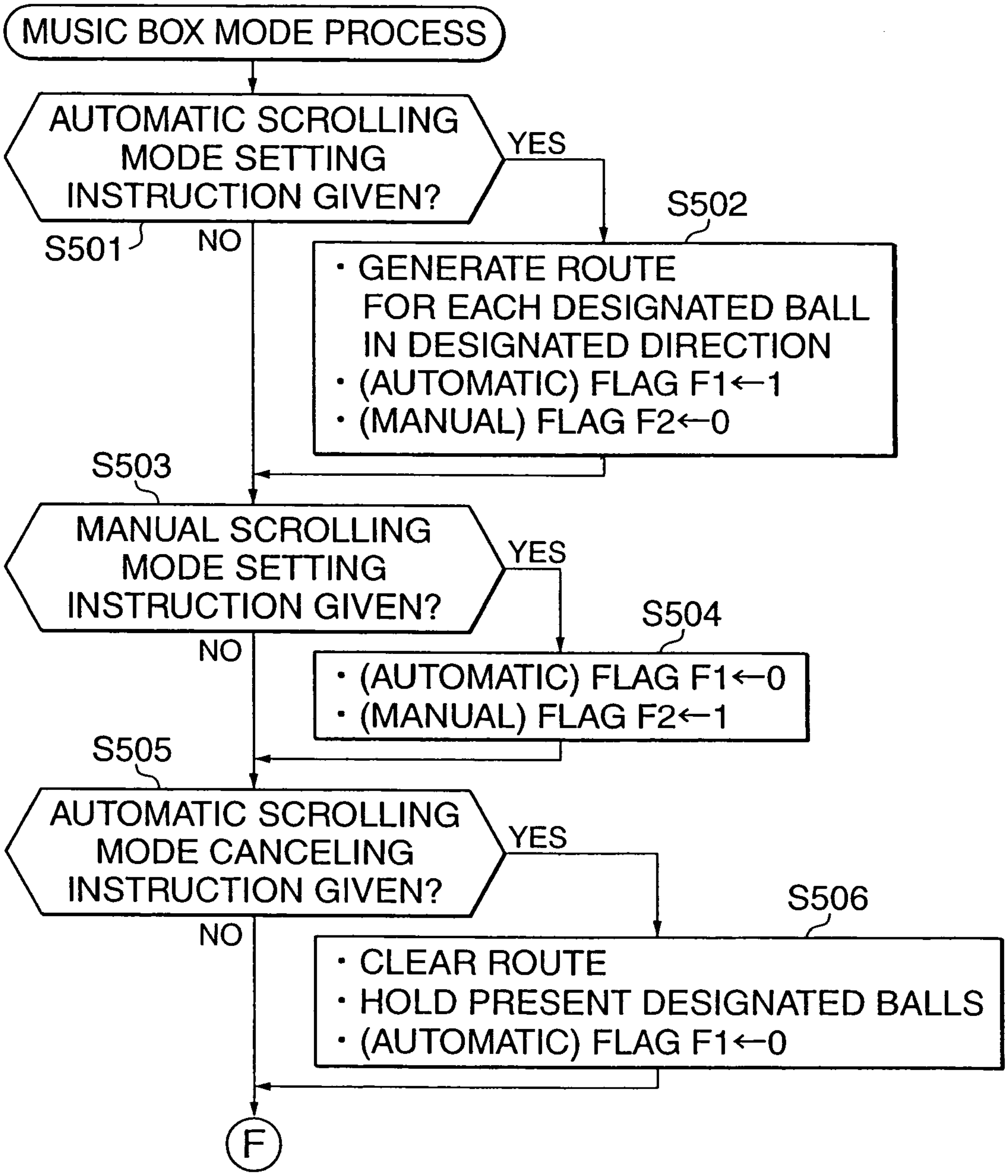
FIGS. 18A and 18B are flow charts showing a music box mode process.
Figure 18B:
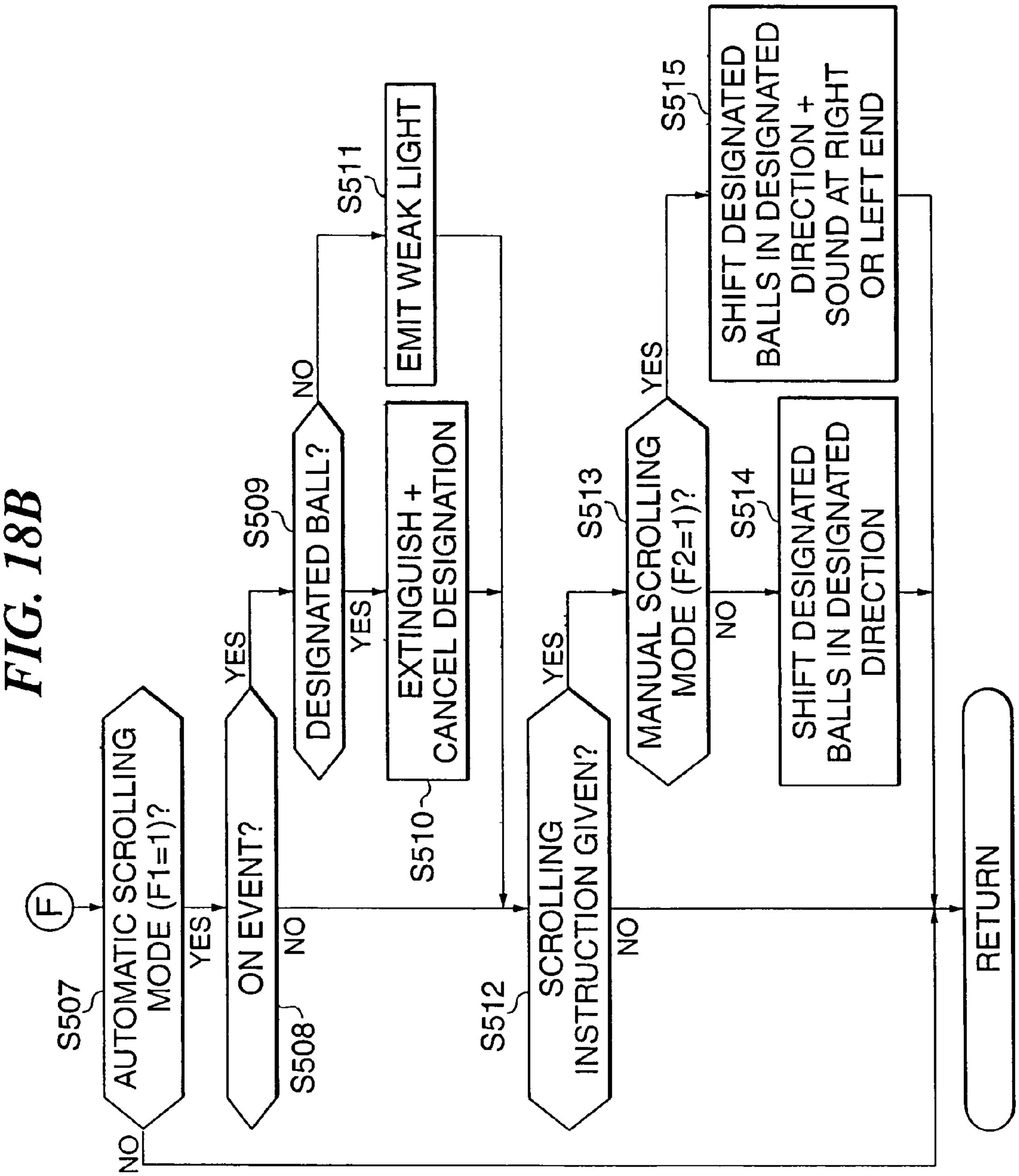

For example, as shown in FIG. 9A, when balls dp1, dp2, and dp3 are designated in the matrix display input section mt, they emit weak light, and a designated ball dp of which designation has been canceled is extinguished (steps S508 to S511 in FIG. 18B).

Then, as shown in FIG. 9B, when the whole matrix area MT is manually scrolled leftward, the whole matrix area MT moves leftward on a plane relative to the matrix display input section mt. As a result, the positions of the designated balls dp2 and dp3 in the matrix display input section mt shift leftward, and the designated ball dp1 comes out of the matrix display input section mt. On this occasion, in the case where the "manual scrolling mode" is not set, no musical tone is sounded (step S512→S513→S514 in FIG. 18B), but if the "manual scrolling mode" is set, a musical tone is sounded at the right or left edge (sounding column P) as described later (step S512→S513→S515 in FIG. 18B).

When balls dp4 and dp5 are newly designated in the matrix display input section mt (FIG. 9C), they emit weak light (step S508→S509→S511 in FIG. 18B), and they are stored as designated balls dp existing in the whole matrix area MT.

Figure 10A:
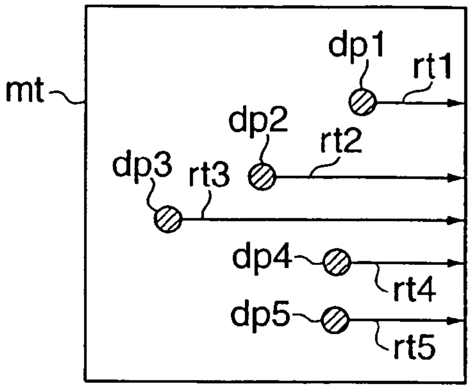
Figure 10C:
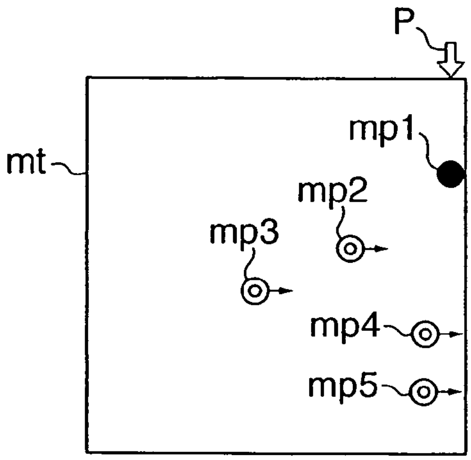
Figure 10B:
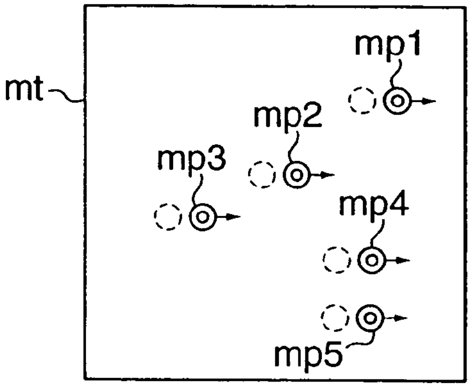
Figure 10D:
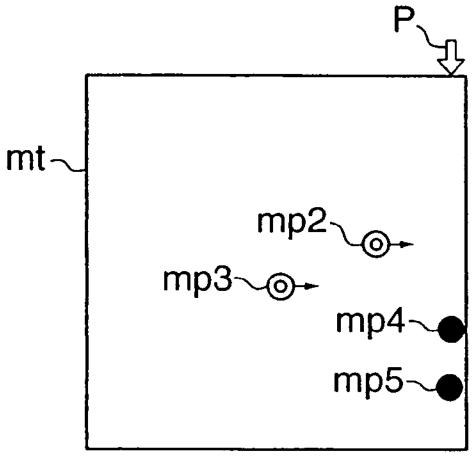
FIG. 10D shows an emission state in the case where another moving ball has reached the right edge of the matrix display input section.

FIGS. 10A to 10D are diagrams useful in explaining an emission state transition of the matrix display input section, schematically showing operations in the automatic scrolling mode in the "music box mode" of the performance apparatus, in which FIG. 10A shows an emission state in the case where rightward scrolling has been instructed, FIG. 10B shows an emission state in the case where moving balls corresponding to respective designated balls move rightward, FIG. 10C shows an emission state in the case where one moving ball has reached the right edge of the matrix display input section, and FIG. 10D shows an emission state in the case where another moving ball has reached the right edge of the matrix display input section.

In the automatic scrolling mode, in response to designation of a rightward or leftward scrolling direction, moving routes rt directed in the designated direction are generated with respect to all the designated balls dp in the whole matrix area MT. The automatic scrolling mode is set and the scrolling direction is designated by operating the panel switch 10, etc.

For example, when rightward scrolling is instructed, moving routes rt1 to rt5 directed rightward and extending from the positions of designated balls dp1 to dp5 are generated as shown in FIG. 10A (step S501→S502 in FIG. 18A), and moving balls mp1 to mp5 corresponding to the respective designated balls dp1 to dp5 move rightward as shown in FIG. 10B (step S109→S114 in FIG. 12). In this case, each moving ball mp moves while emitting weak light (step S116→S122→S123 in FIG. 13), but the designated balls dp are extinguished (steps S114 and S112 in FIG. 12).

If a rightward scrolling direction is designated in the automatic scrolling mode, the rightmost column of the matrix display input section mt is set as the sounding column P. Therefore, for example, when the moving ball mp1 reaches the right edge (the column of n=16) of the matrix display input section mt as shown in FIG. 10C, the moving ball mp1 emits intense light and a musical tone corresponding to the position is sounded, and the moving route rt1 for the moving ball mp1 is cleared (step S116→S117→S118 in FIG. 13). The moving ball mp1 goes out of the matrix display input section mt.

Similarly, the moving balls mp4 and mp5 that reach the sounding column P next emit intense light and a corresponding musical tone is sounded, and the corresponding moving routes rt4 and rt5 are cleared (FIG. 10D). It should be noted that if a leftward scrolling direction is designated in the automatic scrolling mode, the leftmost column of the matrix display input section mt is set as the sounding column P, and other actions are symmetric to those in rightward scrolling.

It should be noted that even in the case where designated balls dp existing in the whole matrix area MT are not appearing in the matrix display input section mt, moving routes rt are generated for them as mentioned above, and therefore, for example, if a rightward direction is designated, the corresponding moving balls mp appear from the left of the matrix display input section mt, emit intense right at the right edge of the matrix display input section mt, and disappear to the right. It may be configured such that each moving ball mp goes through the matrix display input section mt any number of times; in this case, after each moving ball mp disappears once to the right, it appears in the matrix display input section mt from the left.

Figure 11A:
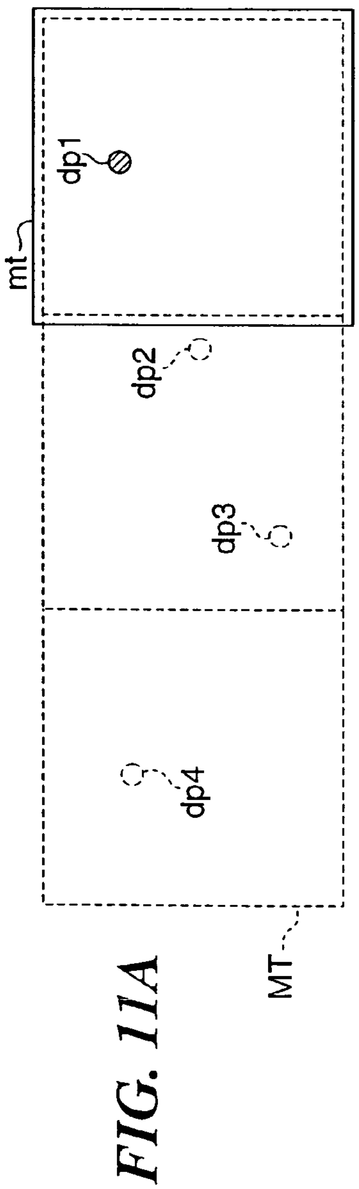
Figure 11B:
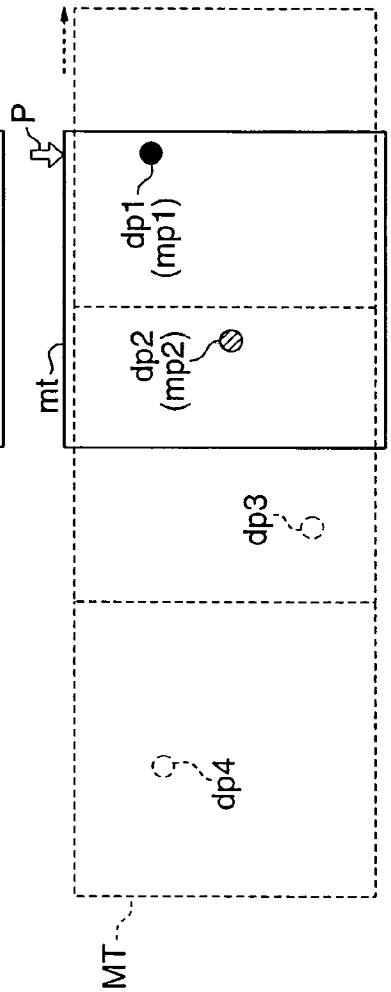
Figure 11C:
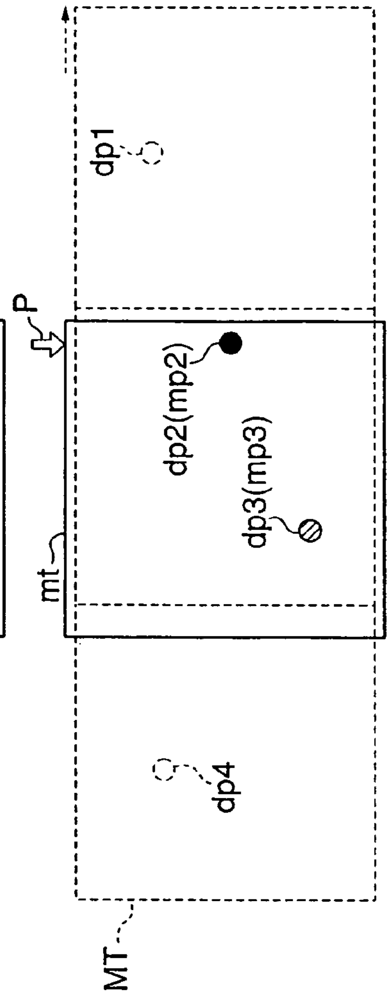

FIGS. 11A to 11C are transition diagrams schematically showing the relationship between the matrix display input section and the whole matrix area in the manual scrolling mode in the "music box mode" of the performance apparatus, in which FIG. 11A shows the case where a plurality of balls have been designated in the whole matrix area, FIG. 11B shows the case where one designated ball has reached the sounding column, and FIG. 11C shows the case where another designated ball has reached the sounding column.

As shown in FIG. 11A, it is assumed that balls dp1 to dp4 are designated in the whole matrix area MT. In this state, if rightward manual scrolling is instructed, the rightmost column of the matrix display input section mt is set as the sounding column P, and the whole matrix area MT moves rightward relative to the matrix display input section mt. In this case, designated balls dp moving with the whole matrix area MT are recognized as moving balls mp, but no moving routes rt are generated for them as is distinct from the other operation modes, and hence they are designated by "dp (mp)".

First, when the designated ball dp1 (mp1) reaches the sounding column P (FIG. 11B), it emits intense light, and a musical tone corresponding to this position is sounded (step S512→S513→S515 in FIG. 18B) Similarly, the designated ball dp2 (mp2) that reaches the sounding column P next emits intense light, and a corresponding musical tone is sounded (FIG. 1C) It should be noted that in the manual scrolling mode, the scrolling direction can be changed even before scrolling is completed. When the scrolling direction changes, the moving direction of the whole matrix area MT relative to the matrix display input section mt changes, and also, the sounding column P is switched to the opposite side.

Next, a description will be given of processing performed in various operation modes with reference to flow charts of FIGS. 12 to 18B.

FIGS. 12 and 13 are flow charts showing a main process executed by the performance apparatus according to the present embodiment. In the present embodiment, it is assumed that sounding of musical tones based on sounding data KC corresponding to respective matrix switches mtSW is a main object of performance; In the following description, sequence data for sounding musical tones based on the sounding data KC, such as a combination of coordinates of designated balls dp, moving route rt, and operation mode, for specifying operation in sounding will be referred to as "matrix performance data" so that it can be distinguished from ordinary automatic performance data in the SMF (Standard MIDI File) format, etc.

It should be noted that information indicative of tempo value, musical instrument tones associated with the respective matrix switches mtSW, and so forth may be included in the matrix performance data. The matrix performance data is stored in the storage device 6 in steps S315 and S316 in FIG. 15B, described later. In steps S316 and S317, what has been stored or received from external equipment is read out and set as a reproduced object in the performance apparatus MC.

First, initialization is performed (step S101). There is any input through operation of the panel switch 10, the corresponding setting is made (steps S102 and S103). For example, mode, musical instrument tones with respect to respective columns n, and tem value representing performance velocity are set. It should be noted that a mode in which performance data such as SMF is received from external equipment and played may be set, too, and in this case, the tem value may be automatically set according to a tempo signal of the transmitted performance data. Alternatively, if the tempo value is set in matrix performance data received from external equipment, the tem value may be set based on the tempo value.

Next, a matrix input acceptance process in FIGS. 15A to 16, described later, is carried out (step S104), and it is determined whether or not there is any other performance data set as a reproduced object (such as SMF other than the matrix performance data) (step S105). If there is any other performance data, sounding processing is performed based on the performance data (step S106). This performance data is different from the sounding data KC, and sounding based on this performance data is performed independently of or in parallel with sounding in the various operation modes mentioned above. Also, in the step S106, if matrix performance data is read out and set in the step S317, sounding processing can be performed on performance data such as MIDI stored in advance in association with the matrix performance data.

Then, it is determined whether or not the set operation mode is the above described "sequential sounding mode" (step S107). If the set operation mode is the "sequential sounding mode", the sequential sounding mode process is carried out as described above (step S108). Then, it is determined whether or not a moving route rt has been generated (step S109). If no moving route rt has been generated, the process returns to the step S102, and on the other hand, if a moving route rt has been generated, it is determined whether or not timing is stepping timing (T=0) (step S110).

Figure 14:
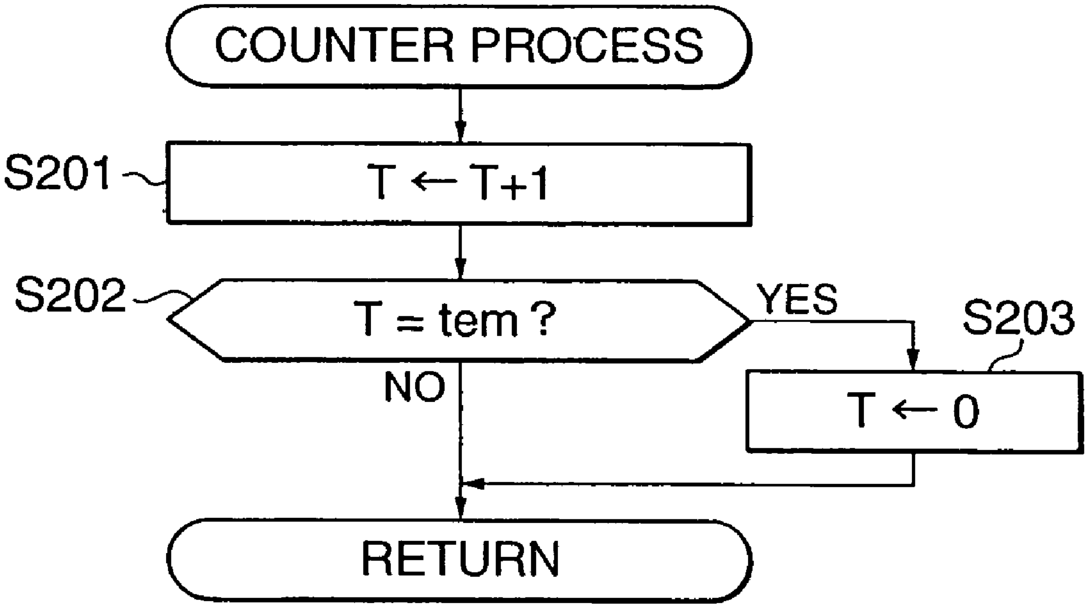
FIG. 14 is a flow chart showing a counter process.

FIG. 14 is a flow chart showing a counter process. This process is carried out at regular time intervals by timer processing. As shown in FIG. 14, the counter value T is incremented each time until T becomes equal to tem (T=tem) (steps S201 and S202). At T=ten, the counter value T is reset to "0" (step S203).

Referring again to FIG. 12, if timing is the stepping timing in the step S110, it is determined whether or not the position of a moving ball mp and the position of a designated ball dp match each other (step S111). If they do not match each other, that is, the moving ball mp is moving on the moving route rt, the matrix display section mtLED at the present coordinates of the moving ball mp is extinguished (step S112), and then the moving ball mp is advanced one step on the moving route rt (step S113; see FIGS. 4D to 4F, 5D, etc). As a result, the matrix display input section LED which the moving ball mp has just left is extinguished. On the other hand, if the position of the moving ball mp and the position of a designated ball dp match each other in the step S111, it is determined whether or not the music box mode is set as the operation mode (step S114). If the music box mode is not set, the matrix display section mtLED at the present coordinates of the moving ball mp is caused to emit weak light (step S115), and then the moving ball mp is advanced one step on the moving route rt (step S113). That is, if the music box mode is not set, when the moving ball mp moves away from the designated ball dp after its position matches the position of the designated ball dp, the designated ball dp is caused to continuously emit weak light.

However, if it is determined in the step S114 that the music box mode is set, the process proceeds to the step S112 to extinguish the designated ball dp after the moving ball mp moves away from the designated ball dp because the automatic scrolling mode in which the moving route rt is generated is set (see FIG. 10B).

Next, it is determined whether or not the moving ball mp matches outer edge coordinates of the matrix display input section mt (step S116). The outer edge coordinates are included in coordinates at any of upper and lower ends or right and left ends, i.e. the first and sixteenth rows (k=1, 16) and the first and sixteenth columns (n=1, 16).

If it is determined in the step S116 that the moving ball mp does not match the outer edge coordinates, it is then determined whether or not the moving ball mp matches any designated ball dp (step S122). If the moving ball mp does not match any designated ball dp, the moving ball mp is caused to emit weak light because it is moving on the moving route rt (step S123; see FIGS. 4D, 4F, and 5D). As a result, the moving ball mp moves while emitting weak light. The process returns to the step S102. On the other hand, if the moving ball mp matches any designated ball dp, the moving ball mp and the designated ball dp which the moving ball mp matches are caused to emit intense light, and a musical tone is sounded based on the corresponding sounding data KC (steps S124; see FIGS. 4E and 5E) and then the process returns to the step S102.

On the other hand, if it is determined in the step S116 that the moving ball mp matches the outer edge coordinates, it is then determined whether or not the automatic scrolling mode in the music box mode is set (F1=1) (step S117). Here, the flag "F1" indicates that the automatic scrolling mode is set when it is set to the value "1", and this flag is set in steps S502, S504, and S506 in FIG. 18A, described later.

If it is determined in the step S117 that the automatic scrolling mode is set, in the automatic scrolling mode, the case where the moving ball mp matches the outer edge coordinates corresponds to the case where the moving ball mp has reached the sounding column P. Therefore, the moving ball mp is caused to emit intense light, a musical tone is sounded based on the corresponding sounding data KC, and the moving route rt for the moving ball mp is cleared (step S118; see FIGS. 10C and 10D). Then, the process proceeds to the step S122. As a result, the moving ball mp goes out of the matrix display input section mt when the moving ball mp is advanced one step next time (step S113 in FIG. 12).

On the other hand, if it is determined in the step S117 that the automatic scrolling mode is not set, the process proceeds to the step S119 wherein it is determined whether or not the predetermined reflecting conditions described above are satisfied.

If the predetermined reflecting conditions are satisfied, a moving route rt for reflection is generated (step S120; see FIGS. 6A, 6C, and 6D), and the process proceeds to the step S122. As a result, when advanced one step next time (step S113 in FIG. 12), the moving ball mp is reflected at outer edge coordinates. On the other hand, if the predetermined reflecting conditions are not satisfied, the moving route rt for the moving ball mp is cleared (step S121), and the process returns to the step S102. As a result, when advanced one step next time (step S113 in FIG. 12), the moving ball mp disappears.

Figure 15B:
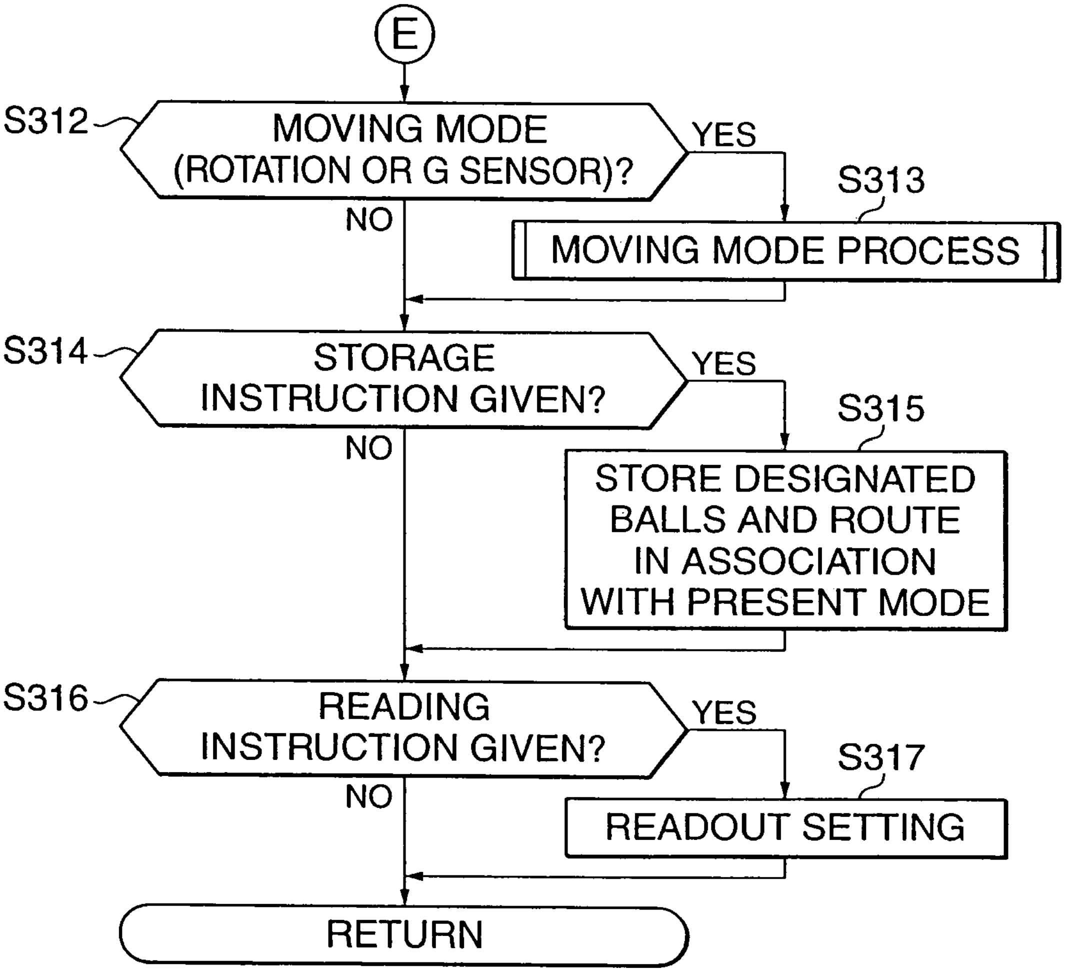
Figure 16:
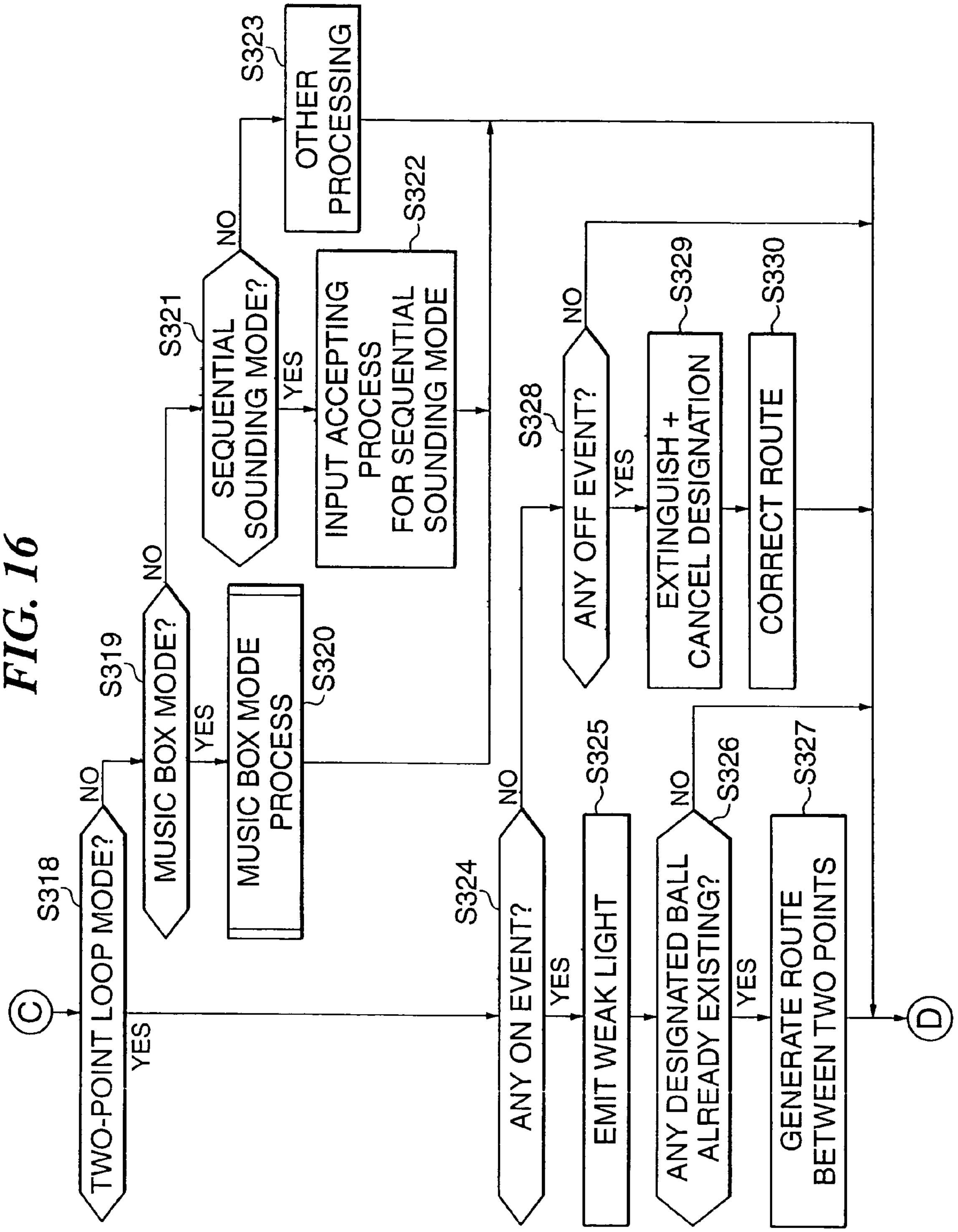
FIG. 16 is a flow chart showing a continued part of the matrix input accepting process in FIG. 15A.

FIGS. 15A to 16 are flow charts showing the matrix input accepting process. First, it is determined whether or not the rotating mode included in the moving modes is set as the operation mode (step S301). If the rotating mode is not set, it is then determined whether or not the random loop mode is set (step S302). If the random loop mode is set, it is then determined whether or not an ON event has occurred, i.e. whether or not any matrix switch mtSW has been depressed (step S303).

If it is determined in the step S303 that an ON event has occurred, it is then determined whether or not there is any existing designated ball dp at the coordinates of the turned-on matrix switch mtSW (step S304). If there is no existing designated ball dp at the coordinates of the turned-on matrix switch mtSW, this means that a new ball dp has been designated, and therefore the matrix switch mtSW turned on this time is brought into the designated state, and the matrix display section mtLED thereof is caused to emit weak light (step S309; see FIG. 4A). At this time, continuous sounding of a musical tone corresponding to the designated ball dp is started.

Next, it is determined whether or not there is any other designated ball dp (step S310). If there is no other designated ball dp, the process proceeds to a step S312. On the other hand, if there is any other designated ball dp, a moving route rt for the random loop mode is generated between the existing other designated ball dp and the newly designated ball dp, and a moving ball mp is generated at the position of the newly designated ball dp (step S311; see FIGS. 4B and 4C), and the process proceeds to the step S312. In the step S311, continuous sounding of the musical tone started in the step S309 is stopped.

On the other hand, if it is determined in the step S304 that there is any existing designated ball dp at the coordinates of the turned-on matrix switch mtSW, the turned-on designated ball dp is extinguished, and the designation thereof is canceled (step S305). Then, it is determined whether or not a plurality of designated balls dp remain (step S306). If a plurality of designated balls remain, it is possible to generate a moving route rt. Therefore, the moving route is corrected (reconnected), i.e. the original moving route rt is cleared, and a new moving route rt is generated between the remaining plurality of designated balls dp (step S307), and the process proceeds to the step S312. If a plurality of designated balls dp do not remain, the original moving route rt is completely cleared because the moving route rt cannot be maintained (step S308), and the process proceeds to the step S312.

If it is determined in the step S302 that the set operation mode is not the random loop mode, it is then determined whether or not the two-point loop mode is set (step S318). If the two-point loop mode is set, it is determined whether or not an ON event has occurred (step S324). If no ON event has occurred, it is then determined whether or not an OFF event has occurred, i.e. whether or not a matrix switch mtSW corresponding to a designated ball dp has been depressed (step S328).

If it is determined in the step S328 that no OFF event has occurred, the process proceeds to the step S312. On the other hand, if an OFF event has occurred, the designated ball dp turned off this time is extinguished and the designation thereof is canceled (step S329), and the moving route is corrected (step S330). In the step S330, if there is an existing moving route rt, it is cleared. In particular, if the designated ball dp turned off lies in front of the moving ball mp in the direction of movement thereof, a new moving route rt that is an extension of the original moving route rt is generated (see FIG. 5G). If there is no moving route rt (a single designated ball dp has been turned off), no moving route rt is generated at this time point. Then, the process proceeds to the step S312.

If it is determined in the step. S324 that an ON event has occurred, the designated ball dp turned on this time is caused to emit weak light (step S325; see FIG. 5A), and it is determined whether or not there is any other existing designated ball dp (step S326). If there is no other existing designated ball dp, the process proceeds to the step S312. On the other hand, if there is any other existing designated ball dp, a moving route rt is generated between the two designated balls dp (step S327).

In this case, if there is one other designated ball dp, a new moving route rt is generated between this designated ball dp and the designated ball dp turned on this time (see FIG. 5B). However, if there are two other designated balls dp, the older one of them is extinguished and the designation thereof is canceled, as well as the original moving route rt is cleared to generate a new moving route rt between the latest two designated balls dp (see FIG. 5C). Then, the process proceeds to the step S312.

If it is determined in the step S318 that the two-point loop mode is not set, it is then determined whether or not the set operation mode is the music box mode or the sequential sounding mode (steps S319 and S321). If the set operation mode is the music box mode, a music box mode process in FIGS. 18A and 18B, described later, is carried out (step S320). If the set operation mode is the sequential sounding mode, the input accepting process for the sequential sounding mode as described above is carried out (step S322). If the set operation mode is neither the music box mode nor the sequential sounding mode, other processing (such as processing for another mode) is carried out (step S323). Then, the process proceeds to the step S312.

If it is determined in the step S301 that the set operation mode is the rotating mode, the process proceeds to the step S312. Also, if it is determined in the step S303 that an ON event has not occurred, the process proceeds to the step S312.

In the step S312, it is determined whether or not the moving mode is set as the operation mode. Only when the moving mode is set, a moving mode process in FIG. 17, described later, is carried out (step S313). Then, it is determined whether or not a storage instruction has been given (step S314). Only when the storage instruction has been given, the designated ball(s) dp, if any, and the moving route rt are stored as matrix data in association with the present operation mode (step S315). Then, it is determined whether or not a matrix performance data readout instruction has been given (step S316). Only when the readout instruction has been given, the matrix performance data is read out and set in the performance apparatus MC so that it can be reproduced (step S317), followed by termination of the process.

FIG. 17 is a flaw chart showing the moving mode process. First, it is determined whether or not the set operation mode is the rotating mode (step S401). If the set operation mode is the rotating mode, it is determined whether or not the group figure is rotating in the random loop mode or the two-point loop mode (step S402). If the group figure is not rotating, it is determined whether or not the rotating instruction Ron has been given (step S405). If the rotating instruction Ron has not been given, the process proceeds to a step S408. On the other hand, if the rotating instruction Ron has been given (see FIG. 7A), the rotational center P0, rotational direction, and rotational speed are computed based on the rotating instruction Ron (step S406), as described above, and the rotation of the group figure is started (step S407; see FIG. 7B). The process then proceeds to the step S408. As a result, until the rotation stopping instruction is given, the group figure rotates each time the moving ball mp is advanced one step (step S113 in FIG. 12).

On the other hand, if it is determined in the step S402 that the group figure is rotating, it is determined whether or not the rotation stopping instruction Roff has been given (step S403). If the rotation stopping instruction Roff has not been given, the process proceeds to a step S408. On the other hand, if the rotation stopping instruction has been given (see FIG. 7C), the rotation of the group figure is stopped (step S404; see FIG. 7D).

If it is determined in the step S401 that the set operation mode is not the rotating mode, it is determined whether or not the set operation mode is the G sensor mode (step S408). If the set operation mode is the G sensor mode, it is determined whether or not there has been a predetermined or lager amount of change in acceleration (step S409). If the set operation mode is not the G sensor mode, or if the set operation mode is the G sensor mode but there has not been the predetermined or larger amount of change in acceleration, the process is terminated. On the other hand, if there has been the predetermined or larger amount of change in acceleration, the controlled object relating to the G sensor mode is controlled in steps S410 to S414.

Specifically, if the controlled object is tempo, the tem value is changed (steps S410 and S413). For example, the tem value varies with a change in acceleration in the direction of the Y-axis; when the front of the performance apparatus MC is tilted downward, the tem value becomes smaller (faster), and when the front of the performance apparatus MC is tilted upward, the tem value becomes larger (slower). It should be noted that the tempo may be changed according to acceleration change in either or both of directions of the X-axis and the Y-axis.

On the other hand, if the controlled object is coordinates, the group figure is shifted in the direction of a change in acceleration in the direction of the X-axis or the Y-axis, that is, in the direction in which the performance apparatus MC is tilted (steps S411 and S414; see FIGS. 8B and 8D). In this case, the amount of shift in coordinates may vary with a change in acceleration per unit time, or may be a fixed value. Taking an example where the amount of shift is equivalent to one coordinate of the matrix display input section mt, the group figure shifts each time the moving ball mp is advanced one step (step S113 in FIG. 12) insofar as the acceleration continues to change.

If the controlled object is neither tempo nor coordinates, parameters as other controlled objects are changed (step S412). The parameters include musical tone parameters such as volume, tone color, effect, and PAN of a musical tone to be sounded, and can be set as desired in advance in the step S103 in FIG. 12. The process is then terminated.

FIGS. 18A and 18B are flow charts showing the music box process carried out in the step S320.

First, an instruction for setting the automatic scrolling mode or the manual scrolling mode is accepted (steps S501 and S503). If an instruction for setting the automatic scrolling mode is given, moving routes rt in a designated direction are generated for respective designated balls dp, and the flag F1 is set to "1" and a flag F2 is set to "0" (step S502; see FIG. 10A). On the other hand, if an instruction for setting the manual scrolling mode is given, the flag F1 is set to "0" and the flag F2 is set to "1" (step S504). Here, the flag F2 indicates that the manual scrolling mode is set when set to the value "1".

Next, an instruction for canceling setting of the automatic scrolling mode is accepted (step S505). In response to this instruction, all the moving routes rt generated for the designated balls dp are cleared and the present designated balls dp are held (returned to weak light-emitting state), and the flag F1 is set to "0" (step S506).

Then, it is determined whether or not the automatic scrolling mode (F1=1) is set (step S507) If the automatic scrolling mode is set, an ON event and a scrolling instruction are accepted, and suitable processing is performed in steps S508 to S515. Specifically, if there is no designated ball dp at the coordinates of the turned-on matrix switch mtSW, its matrix display section mtLED is caused to emit weak light and the matrix switch mtSW is brought into the designated state, and on the other hand, if there is any designated ball dp at the coordinates of the turned-on matrix switch mtSW, its matrix display section mtLED is extinguished and designation thereof is canceled (steps S509 to S511; see FIGS. 9A and 9C). On the other hand, if the automatic scrolling mode is not set, the process is terminated.

If the scrolling instruction is given in the case where the manual scrolling mode is not set, this means that scrolling is only instructed, and hence the designated balls dp are shifted at the velocity based on the scrolling instruction and in the direction indicated by the scrolling instruction (step S514; see FIG. 9B). If the scrolling instruction is given in the manual scrolling mode, the column at a forward end of the matrix display input section mt in the direction indicated by the scrolling instruction is set as the sounding column P, and the designated balls dp are shifted at the velocity based on the scrolling instruction and in the direction indicated by the scrolling instruction, and further, the designated ball dp1 that has reached the sounding column p is caused to emit intense light and a musical tone based on sounding data KC corresponding to this position is sounded (step S515; see FIGS. 11B and 11C). The process is then terminated.

According to the present embodiment, in the random loop mode and the two-point loop mode, when a plurality of balls dp are designated in the matrix display input section mt, a moving route rt is generated and a moving ball mp appears to move on the moving route rt while emitting weak light, and for example, when the position of the moving ball mp matches the position of any of the designated balls dp, the moving ball mp emits intense light and the corresponding musical tone is sounded. In particular, sounding data KC are associated with respective matrix switches mtSW so that different musical tones can be generated with respect to different coordinates, and hence operations such as sounding are not monotonous. Also, due to movement of light and variations in tone, the user can play while recognizing the movement of the moving ball mp. Therefore, a novel way of playing with visual and audio elements can be provided, and interesting performance with game elements can be realized. Also, since it is possible to add designated balls dp and cancel designation of designated balls dp, whereby the moving route rt is accordingly corrected, making performance more interesting. Further, since various operation modes such as the reflecting mode and the moving mode are provided in addition to the sequential sounding mode, the user can play in various manners without feeling bored.

Also, in the moving mode, designated balls dp are rotated and shifted according to a rotating instruction or how the performance apparatus MC itself is tilted or moved, or the tempo and others are variable, so that interesting and dynamic games can be realized.

Further, according to the present embodiment, in the music box mode, designated balls dp can be designated and stored with respect to the whole matrix area MT; by sounding the moving ball mp in the sounding column P, it is possible to sound a musical tone in response to shift of coordinates, realizing interesting performance. In particular, since the whole matrix area MT is so wide as to include the area of the matrix display input section mt, one unit of performance can be long, and thus performance of a longer melody can be enabled.

It should be noted that in the present embodiment, situations in which sounding and light emission are performed can be changed in each operation mode. For example, light emission of the matrix display section mtLED or sounding thereof may be excluded by mode setting. Alternatively, if it is configured such that musical tones based on sounding data KC corresponding to the present position of the moving ball mp are sequentially sounded, sounding pitch becomes higher when the moving ball mp moves upward, so that the user can not only recognize the moving state of the moving ball mp only by tones but also feel realistic sensation, making performance more interesting. It should be noted that musical tones sounded in response to operation of the matrix switches mtSW should not necessarily be monotones, but may be predetermined short melodies or chords.

Also, in the case where musical tones are generated while the moving ball mp is moving, the musical tones should not limited to those based on sounding data KC associated with the matrix switches mtSW, but for example, musical tones determined in advance may be uniformly sounded irrespective of the present position of the moving ball mp.

It should be noted that in storing designated balls dp, moving balls mp, and so forth, coordinates thereof may be stored as absolute values, or as relative positions based on any coordinates.

It should be noted that in the case where there are a plurality of groups in the random loop mode or the two-point loop mode, when moving balls mp of different groups intersect with each other during movement, the moving balls mp may be caused to emit light or be sounded.

It should be noted that in the random loop mode or the two-point loop mode, the moving route rt generated between designated balls dp should not necessarily be a straight line, but may be a curve or a predetermined serpentine curve according to rules determined in advance.

It should be noted that in the two-point loop mode, one group is formed by two designated balls dp, but may be formed by three or more designated balls dp. In this case, for example, when designated balls dp1 to dp3 are designated as constituents of the same group, moving routes rt may be generated between all the designated balls dp; i.e. a moving route rt1 is generated between the designated balls dp1 and dp2, a moving route rt2 between the designated balls dp1 and dp3, and the moving route rt3 between the designated balls dp2 and dp3.

It should be noted that in the music box mode, the length of the whole matrix area MT should not necessarily be equivalent to three pages of the matrix display input section mt, but may be greater than that. Also, the whole matrix area MT should not necessarily extend in a horizontal direction (along the X-axis), and may be in any shape. For example, the whole matrix area MT may extend in a vertical direction (along the Y-axis) as well, so that it can be scrolled vertically or diagonally. In the sequential sounding mode as well, it may be configured such that balls dp can be designated in the whole matrix area MT to enable longer performance.

It should be noted that user's performance may be recorded in real time as an SMF file using the matrix display input section mt of the performance apparatus MC. In this case, the length of a piece of music should not necessarily be limited by the number of columns in the matrix display input section mt, but a sufficient length of music may be recorded as the SMF file. It is preferred that the recorded SMF file can be sent to external equipment, and can be arbitrarily reproduced later using the performance apparatus MC.

It may be configured such that in a versus game played by the performance apparatus MC and another apparatus MC connected to each other via the connecting cable 30, the moving ball mp may be transferred to and from the opponent's performance apparatus MC. Also, it may be configured such that the group figure is transferable as an integral unit; if the group figure can be transferred while maintaining its action such as rotation in the moving mode, performance can be made more interesting.

It should be noted that matrix performance data stored in the steps S314 and S315 in FIG. 15B can be sent and received to and from the opponent's performance apparatus MC in a versus game. Additionally, the matrix performance data can be uploaded into a contents server on the Internet via the communication I/F 7, or can be temporarily stored in the storage medium 17 and uploaded into the contents server via a personal computer, and conversely it may be downloaded from the contents server.

It may be configured such that when pieces of music are changed as in the case where continuous reproduction of two or more pieces of matrix performance data is instructed, a plurality of designated balls dp designated for a first piece of music are gradually extinguished, for example, in order of designation time from the oldest at the end of the first piece of music (fade-out), and on the other hand, at the start of a second piece of music, a plurality of designated balls dp designated for the second piece of music gradually appear while emitting light in order of designation time from the oldest (fade-in).

It should be noted that in the moving mode, the G sensor 24 may be configured to be capable of detecting accelerations in three-dimensional directions (X-, Y-, and Z-axes), and any parameter e.g. musical tone characteristics such as the cur-off frequency of a musical tone to be sounded may be changed according to a change in acceleration in the direction of the Z-axis as well.

It should be noted that those associated with columns (n values) or rows (k values) in the matrix display input section mt are not limited to tone color and pitch, but various other musical parameters may be applied. A display-related parameter as well as the above parameters, or only a display-related parameter may be associated with the columns or rows.

Although in the present embodiment, the matrix display sections mtLED are incorporated into the matrix switches mtSW, and coordinates are designated in the matrix display input section mt and the designated coordinates are displayed in the same, the present invention is not limited to this, but the matrix display sections mtLED and the matrix switches mtSW may be configured as separate bodies. In this case, each matrix display input section mt may be provided with a display function (such as a matrix liquid crystal display section) corresponding to the matrix display section mtLED, and designation of ball dp can be input by a soft switch on a touch panel, etc. or any other operating element. For example, in the case where the present invention is applied to a cellular phone, a matrix is displayed in its liquid crystal display, and an operating element provided in the cellular phone may be used for designating balls dp, etc.

It should be noted that the display function corresponding to the matrix display section mtLED may be provided not only on an upper surface of the performance apparatus MC but also on a lower surface thereof so that the same display can be provided on the upper and lower surfaces at the same time. With this arrangement, situations where the performance apparatus MC is used can be increased because the status of performance can be shown to many people with the upper surface turned to the user and the lower surface turned to audience.

Although in the present embodiment, the matrix display sections mtLED have two levels of brightness, the present invention is not limited to this, but they may have three or more levels of brightness, and the brightness of emitted light may be varied according to e.g. the positional relationship between moving balls mp and designated balls dp. Alternatively, the matrix display sections mtLED may be configured to emit light in a plurality of colors. Also, the matrix display input section mt has only to visibly display designated balls dp and moving balls mp in a matrix, and should not necessarily emit light. For example, the matrix display input section mt may be comprised of a liquid crystal screen, and a plurality of display patterns in areas corresponding to coordinates may be realized by, for example, changing blink rate. It should be noted that the matrix display input section mt should not necessarily be the 16×16 grid, but the number of columns and rows may be different from each other.

Although in the present embodiment, the reflecting mode can be set only in the random loop mode or the two-point loop mode, but it may be configured such that the reflecting mode can be set in other modes.

Although in the present embodiment, the "sequential sounding mode", the "random loop mode, and the "two-point loop mode" cannot be executed in parallel at the same time, it may be configured such that they can be executed in parallel at the same time.

It should be noted that in the rotating mode, light emission and/or sounding may be sequentially performed in real time according to touch on matrix switches mtSW in response to the rotating instruction Ron or the rotation stopping instruction Roff. Also, it may be configured such that information indicative of touched matrix switches mtSW and the speed at which they were touched is output as data, and light emission or sounding processing is performed according to the data. For example, light emission may be controlled such that even after a turned-on matrix switch mtSW is turned off, light emitted for the turned-on matrix switch mtSW remains for a short period of time so that the trace of the finger can be seen as an afterimage. On this occasion, the display mode (such as brightness and fading rate) of the afterimage may be variable according to the speed at which the finger moved, the period of time for which the matrix switch mtSW was depressed, and so forth.

It is to be understood that the object of the present invention may also be accomplished by supplying a system or an apparatus with a storage medium in which a program code of software, which realizes the functions of the above described embodiment is stored, and causing a computer (or CPU or the like) of the system or apparatus to read out and execute the program code stored in the storage medium.

In this case, the program code itself read from the storage medium realizes the functions of the above described embodiment, and hence the program code and a storage medium on which the program code is stored constitute the present invention. Also, if the program code is supplied via a transmission medium, the program code itself constitutes the present invention.

Examples of the storage medium for supplying the program code include a floppy (registered trademark) disk, a hard disk, a magnetic-optical disk, a CD-ROM, a CD-R/RW, a DVD-ROM, a DVD-RAM, a DVD-R/RW, a DVD+RW, an NV-RAM, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A performance apparatus comprising:

an input device having a plurality of matrix switches arranged in a two-dimensional matrix pattern, each of the matrix switches being designatable as a coordinate in a two-dimensional area;

a sounding data generating device that generates sounding data corresponding to designated coordinates in the two-dimensional area;

a musical tone generation instructing device that instructs sounding of musical tones based on the sounding data generated by said sounding data generating device; and a moving coordinate generating device that sets a moving route based on the designation of at least two coordinates, and generates moving coordinates indicating corresponding present position coordinates on the set moving route among the coordinates in the two-dimensional area, wherein at least when the moving coordinates reach predetermined coordinates on the moving route, said sounding data generating device generates sounding data corresponding to the predetermined coordinates, and said musical tone generation instructing device instructs sounding of a musical tone based on the sounding data generated in association with the predetermined coordinates.

2. A performance apparatus according to claim 1, wherein the moving route is set to pass through a plurality of designated coordinates and to extend along a substantially straight line connecting between the designated plurality of coordinates.

3. A performance apparatus according to claim 1, wherein each designated coordinate is cancellable, and the performance apparatus further comprises a route correcting device that corrects the moving route when any of the designated coordinates on the moving route is canceled.

4. A performance apparatus according to claim 1, further comprising a route correcting device that, when the moving coordinates reach an outer edge of the two-dimensional area, corrects the moving route so as to cause the moving coordinates to be reflected at coordinates of the outer edge.

5. A performance apparatus according to claim 1, further comprising a shifting device that shifts a plurality of coordinates designated by said coordinate designating device while maintaining a relative positional relationship therebetween.

6. A performance apparatus according to claim 1, further comprising:

a plurality of visible display sections arranged with respect to respective coordinates in the two-dimensional area; and a visible display section controller that controls the plurality of visible display sections, wherein said visible display section controller controls displaying of, at least when the moving coordinates reach the predetermined coordinates on the moving route, a visible display section corresponding to the predetermined coordinates.

7. A performance apparatus according to claim 1, wherein said moving coordinate generating device sets the moving route according to a number of designated coordinates.

8. A method of controlling a performance apparatus having an input device with a plurality of matrix switches arranged in a two-dimensional matrix pattern, each of the switches being designatable as a coordinate in a two-dimensional area, the method comprising:

a coordinate designating step of designating at least two of the matrix switches as individual coordinates in the two-dimensional area;

a sounding data generating step of generating sounding data corresponding to the switches of the designated coordinates in the two-dimensional area;

a musical tone generation instructing step of instructing sounding of musical tones based on the sounding data generated in said sounding data generating step; and a moving coordinate generating step of setting a moving route based on the coordinates designated in said coordinate designating step, and generating moving coordinates indicating corresponding present position coordinates on the set moving route among the coordinates in the two-dimensional area, wherein at least when the moving coordinates reach predetermined coordinates on the moving route, the musical tone data generating step generates sounding data corresponding to the predetermined coordinates, and the musical tone generation instruction step instructs sounding of a musical tone based on the sounding data generated in association with the predetermined coordinates.

9. A performance apparatus comprising:

an input device having a plurality of matrix switches arranged in a two-dimensional matrix pattern, each of the matrix switches being designatable as two-dimensional coordinate;

a coordinate moving device that moves designated coordinates in a predetermined direction; and a musical tone generation instructing device that, when the designated coordinates moved by said coordinate moving device reach predetermined coordinates, instructs sounding of a musical tone corresponding to the predetermined coordinates.

10. A performance apparatus according to claim 9, wherein said coordinate moving device moves the designated coordinates while maintaining relative positional relationship between the designated coordinates.

11. A performance apparatus according to claim 9, wherein each of the matrix switches is designatable as a coordinate in a two-dimensional display area, and the performance apparatus further includes a visible display section controller that controls a plurality of visible display sections in the two-dimensional display area, and an area moving device that moves a designation enable area on a plane relative to the two-dimensional display area, and wherein said visible display section controller controls displaying of at least one of the visible display sections corresponding to the designated coordinates.

12. A performance apparatus according to claim 9, wherein said musical tone generating instructing device, when the designated coordinates moved by said coordinate moving device reach an outer edge position of a predetermined area, instructs sounding of a musical tone corresponding to the outer edge position.

13. A performance apparatus according to claim 9, wherein said coordinate moving device causes the designated coordinates being moved to disappear from a predetermined area after the designated coordinates reach an outer edge position of the predetermined area.

14. A performance apparatus according to claim 9, said coordinate moving device carries out at least one of automatic movement or manual movement of the designated coordinates that have been designated.

15. A computer-readable medium storing a computer program for controlling a performance apparatus having an input device with a plurality of matrix switches arranged in a two-dimensional matrix pattern, each of the switches being designatable as a two-dimensional coordinate, the computer program comprising:

a coordinate designating instruction for designating two-dimensional coordinates;

a coordinate moving instruction for moving the coordinates designated in said coordinate designating step in a predetermined direction; and a musical tone generation instruction for instructing sounding of a musical tone corresponding to predetermined coordinates when the designated coordinates moved in said coordinate moving instruction reach the predetermined coordinates.

* * * * *